United States Patent [19]

Moriya et al.

[11] Patent Number: 4,839,432

[45] Date of Patent: Jun. 13, 1989

[54] METHOD OF MANUFACTURING A GRAFTED RESIN COMPOSITION

[75] Inventors: Yasuo Moriya; Nobuyoshi Suzuki; Hiroshi Goto, all of Chita, Japan

[73] Assignee: Nippon Oil and Fats Co., Ltd., Tokyo, Japan

[21] Appl. No.: 156,317

[22] Filed: Feb. 16, 1988

[30] Foreign Application Priority Data

| Mar. 18, 1986 | [JP] | Japan | 62-63187 |
| Feb. 18, 1987 | [JP] | Japan | 62-34941 |
| May 11, 1987 | [JP] | Japan | 62-114022 |
| May 11, 1987 | [JP] | Japan | 62-114023 |
| Aug. 10, 1987 | [JP] | Japan | 62-199613 |
| Aug. 10, 1987 | [JP] | Japan | 62-199614 |
| Aug. 10, 1987 | [JP] | Japan | 62-199616 |
| Aug. 10, 1987 | [JP] | Japan | 62-199617 |
| Aug. 10, 1987 | [JP] | Japan | 62-199620 |
| Aug. 10, 1997 | [JP] | Japan | 62-199619 |

[51] Int. Cl.$^4$ ............... C08F 120/36; C08F 112/08; C08F 6/00

[52] U.S. Cl. ............... 525/303; 525/243; 525/263

[58] Field of Search ............... 525/303, 243, 263, 107

[56] References Cited

U.S. PATENT DOCUMENTS 4,233,418 11/1980 Lingier et al. ............... 525/263
4,376,847 3/1983 Matsubara et al. ............... 525/303

Primary Examiner—John C. Bleutge
Assistant Examiner—Annabel Lee
Attorney, Agent, or Firm—Flynn, Thiel, Boutell & Tanis

[57] ABSTRACT

A graft polymerization precursor is prepared through polymerization caused by impregnating an ethylene polymer with a vinyl monomer and a radical polymerizable PO, or a mixture of this graft polymerization precursor and an ethylene polymer and vinyl polymer, is kneaded in a molten state at 100° to 300° C. By so doing, a resin composition having a revolutionary high grafting efficiency can be obtained, so that secondary coagulation can be prevented.

13 Claims, No Drawings

METHOD OF MANUFACTURING A GRAFTED RESIN COMPOSITION

BACKGROUND OF THE INVENTION

1. Field of the Invention

This invention relates to a method of manufacturing a grafted resin composition, which is useful as an adhesive, coating agent, quality improver, microdispersion promoter, polymer alloy precursor, functional molding material, agent for providing solubility of polymer, etc. and permits a high grafting efficiency to be obtained.

2. Prior Art

Heretofore, ethylene polymers have been used extensively owing to their excellent characters, and also there have been attempts to improve their characters and use them in new fields.

For example, low density ethylene polymers have been used as molding materials because the their moldability and the satisfactory physical and chemical properties of products made therefrom.

Also, it has been practiced to mix vinyl polymers, e.g., polystyrene, with low density ethylene polymers as a molding material, in order to improve the rigidity, dimensional stability, printing property, etc. of the low density ethylene polymers.

Further, it is well known in the art that epoxy-group-containing olefin copolymers provide satisfactory adhesive force as an adhesive to bond together metal and plastic materials due to their polarity. Further, since they have elasticity and reactive properties, they are used as condensation series polymers; particularly, they are used as impact improving agents by being reacted with engineering plastics.

Further, since the ethylene-(meth) acrylic ester copolymers and α-olefin-vinyl ester copolymers have excellent flexibility, weather-proof property and impact resistance, they are extensively used as molding materials and α-olefin-vinyl ester copolymers are also broadly used for hot-melt adhesives. Further, recently there have been attempts as both copolymers to use impact resistance improving agents for engineering plastics.

Further, since ethylene-propylene copolymer rubber and ethylene-propylene-diene copolymer rubber have excellent rubber elasticity, flexibility, coldness-proof property and weather-proof property, they are extensively used as rubber materials, and also recently there have been attempts to use them as impact resistance improving agents for engineering plastics.

However, since olefin polymers and vinyl polymers are not satisfactorily compatible with each other, it is not practiced to incorporate more than 10% by weight of vinyl copolymer in mixtures of them. Usually, the vinyl polymer is incorporated in an amount of only by 0.2 by 5% by weight. Even when such a small quantity of vinyl copolymer is mixed, the impact resistance of the mixtures is reduced due to the unsatisfactory mutual solubility of the two resins, and also a deteriorated appearance is apt to occur.

Further, when ethylene copolymers are used as impact resistance improving agents, sufficient impact resistance improvement effect can not be obtained because of the low mutual solubility and dispersion property.

For example, in the case of the epoxy-group-containing olefin copolymer, the scope of applications is limited to materials which can react with an epoxy group. Therefore, it has been apt to occur that sufficient adhesive force can not be obtained with materials which do not react with an epoxy group, e.g., vinyl copolymers, or sufficient impact resistance can not be obtained due to low dispersion force with respect to materials.

Therefore, there have been attempts to increase their compatibility with engineering plastics.

For example, there have been attempts to increase the compatibility with the engineering plastics by increasing the proportion of ethylene-(meth) acrylic ester copolymer component and α-olefin-vinyl ester copolymer component with respect to the (meth) acrylic ester or vinyl ester. Further, it has been attempted to introduce functional groups such as epoxy group, carboxyl group and acid anhydride group for reaction with residual functional groups of engineering plastics, particularly, condensation engineering plastics, to increase the compatibility and improve the impact resistance improvement effect. In the meantime, it is well-known in the art that graft copolymers, in which a polymer having a high compatibility with other resins and a functional polymer are chemically combined in a molecule, are preferred to improve the compatibility with respect to other resins.

Generally, as a method of grafting combining a vinyl polymer with an olefin polymer, there has been proposed an olefin polymer, which is obtained by graft polymerizing a vinyl monomer, e.g., styrene monomer, with olefin polymer by irradiation with ionizable radiation. This method provides considerable effects for causing uniform dispersion of the vinyl copolymer in the olefin polymer. As further well-known method, there is a liquid graft polymerization method making use of such a solvent as xylene or toluene. Also, there is an emulsification graft polymerization method.

Further, it has been proposed to impregnate olefin polymer particles with vinyl monomers and cause polymerization of the resultant system using an aqueous suspension (as disclosed in Japanese Patent Publication No. Sho 58-51010 Japanese Patent Publication No. Sho 58-53003. According to this method, in the polymerized resin composition, the vinyl polymer is uniformly mixed. With this method, satisfactory results can be obtained in comparison to other methods.

However, the prior art method for causing graft coupling of vinyl polymers of olefin polymers is not fully satisfactory. More specifically, the method of irradiation by ionizable radiant rays is based on a special process of a radiation graft polymerization process. Therefore, this method has problems in economy and encounters difficulties in putting it into practice. Further, in this method there is a limitation in the amount of vinyl monomers to be introduced.

Further, in the solution graft polymerization process, polymerization is done in a state in which the system to be graft polymerized is diluted in a large quantity of solvent. From the standpoint of the compatibility of the olefin polymer, there is less opportunity for contact with vinyl monmers, polymerization initiators, and olefin polymers with one another, and generally the reaction efficiency of the vinyl monomers is low. Further, there are complicated after-treatment steps for vinyl monomers, which is economically disadvantageous.

Further, there is the emulsification graft polymerization process. In this case, the reaction is limited only to the on-surface reactions of olefin polymer particles. In the process of polymerization in a water suspension, the grafting efficiency of the resin composition obtained by this process is low. Therefore, vinyl polymer particles which have been uniformly dispersed at the end of the completion of polymerization, are liable to be agglomerated secondarily due to heating in the secondary processing or contact with the solvent, thus giving rise to problems when using the obtained resin composition as microdispersion promoters, compatibilizers of polymer alloys and agents for providing polymer compatibility.

SUMMARY OF THE INVENTION

An object of the invention is to provide a resin composition, which has high grafting efficiency with respect to olefin polymer or polymers and vinyl polymer or polymers.

Another object of the invention is to provide a graft resin composition in a short period of time, easily and using common equipment.

A further object of the invention is to provide a graft resin composition, which permits a change in the kneading proportions by merely changing the component proportions during the process of its manufacture.

The present invention is predicated on a finding that a resin composition having a revolutionarily high grafting efficiency can be obtained by kneading a particular graft polymerization precursor in a melted state at a particular temperature.

According to the invention, there is provided a method of manufacturing a grafted resin composition by causing a grafting reaction of a graft polymerization precursor or a mixture consisting of 1 to 99% by weight of the graft polymerization precursor and 99 to 1% by weight of a polymer by melting the graft polymerization precursor or mixture at a temperature of 100° to 300° C. and kneading it.

The graft polymerization precursor is a resin composition prepared by suspending 100 parts by weight of an ethylene polymer, adding to the resultant suspension a solution obtained by dissolving in 5 to 400 parts by weight of one or more vinyl monomers selected from a group consisting of a aromatic vinyl monomers, (meth) acrylic ester monomers, (meth) acrylic ester monomers, (meth) acrylonitrile and vinyl ester monomers and adding to the suspension from 0.1 to 10 parts by weight, with respect to 100 parts by weight of the vinyl monomers or monomers, of one or more radical polymerizable organic peroxides represented by (1) the formula.

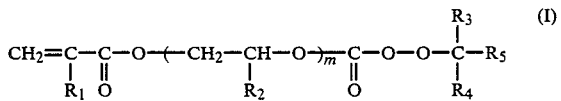

where $R_1$ represents a hydrogen atom or an alkyl group with a carbon number of 1 to 2, $R_2$ is a hydrogen atom or a methyl group, $R_3$ and $R_4$ are alkyl groups with carbon numbers of 1 to 4 and $R_5$ is an alkyl group, a phenyl group or an alkyl-substituted phenyl group with a carbon number of 1 to 12 or a cycloalkyl group with a carbon number of 3 to 12, and m is 1 or 2, or (2) the formula.

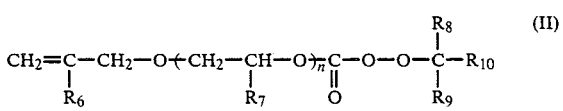

where $R_6$ is a hydrogen atom or an alky group with a carbon number of 1 to 4, $R_7$ is a hydrogen atom or a methyl group, $R_8$ and $R_9$ are alkyl groups with carbon numbers of 1 to 4, $R_{10}$ is an alkyl group, a phenyl group or an alkyl-substituted phenyl group with a carbon number of 1 to 12 or a cycloalkyl group with a carbon number of 3 to 12, and n is 0, 1 or 2, and 0.01 to 5 parts by weight, with respect to 100 parts by weight of the sum of the vinyl monomers and radical polymerizable organic peroxides, of a radical polymerization initiator having a decomposition temperatures of 40° to 90° C. for obtaining a half reduction period of 10 hours, heating the resultant mixture under a condition that the radical polymerization initiator is not substantially decomposed to cause impregnation of ethylene polymer with the vinyl monomer or monomers, the radical polymerizable organic peroxides and the radical polymmerization initiator and elevating, when the content of free vinyl monomer or monomers, radical polymerizable organic peroxide or peroxides and radical polymerizable initiator becomes less than 50% weight of the initial amount, the temperature of the water suspension to cause copolymerization of the vinyl monomer or monomers, radical polymerizable organic peroxide or peroxides in the ethylene polymer.

The polymer forming the mixture with the graft polymerization precursor is either one or both members of a group consisting of (i) ethylene polymer and (ii) a vinyl polymer obtained through polymerization of one or more members of a group consisting of aromatic vinyl monomers, (meth) acrylic ester monomers, (meth) acrylonitrile and vinyl ester monomers.

Example of the ethylene polymer according to the invention are low-density ethylene polymers, epoxy-group-containing ethylene copolymer obtained through ethylene and (meth) acrylicglycidyl, ethylene copolymer consisting of ethylene and (meth) acrylic ester, ethylene co-polymer consisting of ethylene and vinyl ester, ethylene-propylene copolymer rubber, ethylene-porpylene-diene copolymer rubber.

The low density ethylene polymer according to the invention has a density of 0.910 to 0.935 g/cm, and its specific examples are ethylene polymer obtained by the high pressure polymerization process and copolymers of ethylene and α-olefin for density control, e.g., propylene, butene-1, pentene-1, etc.

The low density ethylene polymer may be in the form of pellets with diameters of 1 to 5 mm or in powdery form. These shapes may be suitably selected according to the proportion of low density ethylene polymer in graft polymerization precursor. For example, where proportion of the low density ethylene polymer in the graft polymerization precursor is 50% by weight or above, pellets are suitable. If it is less than 50% by weight, it may be in the powder form. The epoxy-group-containing ethylene copolymer according to the invention is obtained through copolymerization of ethylene and glycidyl (meth) acrylate. Glycidyl (meth) acrylate is incorporated for copolymerization in 0.5 to 40% by weight, preferably 2 to 20% by weight. If the ratio is less than 0.5% by weight, sufficient effect can not be obtained when the preformer is used as impact resistance promoter. If the ratio exceeds 40% by weight; the fluidity when the preformer is melted is reduced. When the ratio of glycidyl (meth) acrylate is less than 40% by weight, it is possible to select for copolymerization one or more members of a group consisting of (meth) acrylic ester monomers, e.g., (meth) acrylic methyl and (meth) acrylic ester, vinyl ester monomers, e.g., vinyl acetate and vinyl propionate, other vinyl monomers, (meth) acrylonitrile, vinyl aromatic monomers and carbon monoxide in accordance with the invention. Examples of the epoxy-group-containing copolymer are ethylene glycidyl methacrylate copolymer, ethylene-vinyl acetate glycidyl methacrylate copolymer, ethylene-carbon monoxide glycidyl methacrylate copolymer, ethylene glycidyl acrylate copolymer and ethylene vinyl acetate glycidyl acrylate copolymer. Among these examples, ethylene-glycidyl methacrylate copolymer is most preferred.

The epoxy-group-containing ethylene copolymers noted above may be used in combination.

The epoxy-group-containing ethylene copolymer may be in the form of particles or pellets with diameters ranging from 0.1 to 5 mm. These shapes are suitably selected according to the proportion of epoxy-group-containing ethylene copolymer. If the diameter is excessively large, not only the dispersion is difficult at the time of the impregnation, but also the period of impregnation of vinyl monomer or the like is extended. Examples of ethylene-(meth) acrylic ester copolymer are ethylene-methyl(meth)acrylate copolymer, ethylene-ethyl(meth)acrylate copolymer and ethylene-butyl(meth)acrylate copolymer. Of these examples ethylene-ethyl acrylic copolymer is most suited.

In the ethylene-(meth) acrylic ester copolymer, the (metha-and/or) acrylic ester moiety is incorporated in an amount of 1 to 50% by weight, preferably 2 to 40% by weight. If the copolymerization ratio is 1% by weight or less, a sufficient effect can not be obtained when the precursor is used as an impact resistance promoter. If the ratio exceeds 50% by weight, the moldability is reduced. The shape and proportion of ethylene-(meth) acrylic ester copolymer are like those of epoxy-group-containing ethylene copolymer.

The ethylene-vinyl ester copolymer according to the invention is obtained through copolymerization of ethylene and one of more vinyl ester monomers selected from the group consisting of vinyl propionate, vinyl acetate, vinyl caproate, vinyl caprylate, vinyl laurate, vinyl stearate and vinyl triflouroacetate in the presence of a radial polymerization initiator. Of these examples, ethylene-vinyl acetate copolymer is most suited. The copolymerization ratio of vinyl ester monomers in the ethylene-vinyl ester copolymer is the same as the (meth) acrylic ester copolymer in the ethylene-(meth) acrylic ester copolymer.

The shape and proportion of ethylene-vinyl ester copolymer are like those of ethylene-(meth) acrylic ester copolymer.

The ethylene-propylene copolymer rubber or ethylene-propylene-diene copolymer rubber is ethylene-propylene copolymer rubber, which contains 40 to 80% by weight of ethylene and 60 to 20% by weight of propylene and has a Mooney vicsocity of 15 to 90, and a ternary copolymerized rubber, which is composed of 40 to 80% of ethylene and 60 to 20% by weight of propylene and contains non-conjugated diene component ethylidene norbornene, 1, 4-hexadiene and dicyclopentadiene. Suitably, its diene content is 4 to 30 in terms of iodinated, and its Mooney viscosity is 15 to 120. The mooney viscosity is obtained in conformity to JISK 6300 (100° C.).

Mixtures of these ethylene-propylene copolymer rubber and ethylene-propylene-diene copolymer rubber may be used as well. To facilitate the impregnation of the vinyl monomers and prevent agglomeration at the time of suspension polymerization, the particles of the ethylene-propylene copolymer rubber or ethylene-propylene-diene copolymer rubber are suitably pellets in a narrow diameter range and with diameters of 2 to 8 mm. If the diameter is excessive, not only the dispersion at the time of the impregnation, but also the speed of impregnation of vinyl monomers is reduced to prolong the reaction time. Specific examples of the vinyl monomer according to the invention are vinyl aromatic monomers, e.g., styrene, nucleus substituted styrene, e.g., methyl styrene, dimethyl styrene, ethyl styrene, isopropyl styrene and chloro-substituted styrene, α-substituted styrenes, e.g., α-methyl styrene and α-methyl styrene, (meth) acrylic ester monomers, e.g., alkyl ester with a carbon number 1 to 7 of (meth) acrylic acid, (meth) acrylonitrile, and vinyl ester monomers, e.g., vinyl propionate, vinyl acetate, vinyl caproate, vinyl caprylate, vinyl laurate, vinyl stearate and vinyl triflor-oacetate.

Further, it is possible to use halogenated vinyl and vinylidene components (particularly, vinyl chloride and vinylidene chloride), vinyl naphthalene, vinyl carbazole, acrylamide, methacrylamide, maleic anhydride, and others. These components may be used either alone or in combination. Of these compounds, vinyl aromatic monomers and (meth) acrylic ester monomers are preferred.

Particularly, in application to impact resistance improvement agent for engineering plastics, it is desirable to use what is obtained through polymerization of mixtures containing 50% or above of vinyl aromatic monomers and (meth) acrylic ester monomers. The reason is that it has satisfactory solubility to engineering plastics.

Particularly, hydrophilic or solid vinyl monomers are suitably dissolved in monomers soluble with respect to oil when they are used. In the preparation of the graft polymerization precursor, the vinyl monomers are suitably incorporated in 5 to 400 parts by weight, preferably 10 to 200 parts by weight, with respect to 100 parts by weight of ethylene polymer. If the amount is less than 5 parts by weight, sufficient performance as a graft can be difficult to obtain in spite of the fact that the graft after the grafting reaction has a high grafting efficiency.

When the amount exceeds 400 parts by weight, the proportion of vinyl monomer, radical polymerizable organic peroxide and radical polymerization initiator represented by the formulas I and II that are not impregnating the ethylene polymer is liable to exceed 50% by weight, thus increasing the amount of free sole vinyl system monomers.

According to Japanese Patent Publication Sho 58-51010 or Japanese Patent Publication No. Sho 58-53003, it is taught that in the water suspension polymerization process it is necessary that the free vinyl monomers are less that 20% by weight in amount.

According to the invention, however, the obtainable graft polymerization precursor has a peroxide group in its vinyl polymer molecule and has a grafting function. Therefore, a sufficiently excellent grafting function can be obtained even if the sum of the free vinyl monomers, radical polymerizable organic peroxides represented by the formula I and II is above 20% by weight in so far as its content is less than 50% by weight.

The radical polymerizable organic peroxide which is used in accordance with the invention, is represented by the formula I or II.

Specific examples of the compound represented by the formula I are t-butylperoxyacryloyloxyethyl carbonate, t-amylperoxyacryloyloxyethyl carbonate, t-hexylperoxyacryloyloxyethyl carbonate, 1, 1, 3, 3-tetramethylethylbutylperoxyacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-amylperoxymethacryloyloxyethyl carbonate,t-amylperoxymethacryloyloxyethyl carbonate, t-hexylperoxymethacryloyloxyethyl carbonate, 1, 1, 3, 3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyethyoxyethyl carbonate, t-amylperoxyacryloyloxyethoxyethyl carbonate, t-hexylperoxyacryloyloxyethoxyethyl carbonate, 1, 1, 3, 3-tetramethylbutylperoxyacryloyloxyethoxyethyl carbonate, cumylperoxyacryloyloxyethoxyethyl carbonate, p-isopropylcumylperoxyacryloyloethoxyethyl carbonate, t-butylperoxymethacryloyloxyethoxyethyl carbonate, t-amylperoxymethacryloyloethoxyethyl carbonate, t-hexylperoxymethacryloyloxyethoxyethyl carbonate, 1, 1, 3, 3-tetramethylbutylperoxymethacryloyloxyethoxyethyl carbonate, cumylperoxymethacryloyloxyethyoxyethyl carbonate, p-isopropylcumylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisopropyl carbonate, 1, 1, 3, 3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1, 1, 3, 3-tetramethylbutylperoxymethacryloyloxyisopropyl carbonate, 1, 1, 3, 3-tetramethylbutylperoxymethacryloyloxyisopropyl carbonate, cumlperoxylmethacryloyloxyisopropyl carbonate, p-isopropylcumlperoxymethacryloyloxyisopropyl carbonate.

Specific examples of the compound represented by the formula II are t-butylperoxyallyl carbonate, t-hexylperoxyallyl carbonate, 1, 1, 3, 3-tetramethylbutylperoxyallyl carbonate, p-menthaneperoxyallyl carbonate, t-butylperoxymethallyl carbonate, t-amylperoxymethallyl carbonate, t-hexylperoxymethallyl carbonate, 1, 1, 3, 3-tetramethylbutylperoxymethallyl carbonate, p-menthaneperoxymethallyl carbonate, cumylperoxymethacryl carbonate, t-amylperoxyallyloxyethyl carbonate, t-hexylperoxyacryloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethacryloxyisopropyl carbonate, t-amylperoxymethallyloxyisopropyl carbonate and t-hexlperoxymethallyloxyisopropyl carbonate.

Among these compounds, t-butylperoxyacryloyloxy ethyl carbonate, t-butylperoxymethacryloyloxyethyl carbonate, t-butylperoxyallyl carbonate and t-butylperoxymethallyl carbonate are preferred.

The radical polymerizable organic peroxide is incorporated in an amount of 0.1 to 10 parts by weight with respect to 100 parts weight of vinyl monomers.

When the proportion is less than 0.1 parts by weight, the amount of active oxygen having the graft polymerization precursor according to the invention is insufficient, so that it is difficult to display sufficient grafting function.

When the amount exceeds 10 parts by weight, the radical polymerizable organic peroxide is inductively decomposed during the polymerization, so that a large amount of gel is generated in the graft polymerization precursor at the instant of the end of the grafting reaction. Further, although the grafting capacity of the graft polymerization precursor is increased, the gel formation capacity is also increased, which is undersired. With the radical polymerization initiator which is used in the preparation of the graft polymerization precursor according to the invention, the decomposition temperature for obtaining a half reduction period of 10 hours (hereinafter referred to as 10-hour half reduction period) is 40° to 90° C., preferably 50° to 75° C.

The polymerization in the preparation of the grafted polymerization precursor according to the invention, has to be done under a condition that the radical polymerizable organic peroxide is not decomposed at all. Meanwhile, because the 10-hour half reduction period temperature for radical polymerizable organic peroxide is 90° to 110° C., the polymerization temperature should be less than 110° C.

If the 10-hour half reduction period temperature of the radical polymerization initiator exceeds 90° C., the polymerization temperature is increased, so that there arises a possibility that the polymerization temperature is increased and the radical polymerizable organic peroxide is decomposed during the polymerization. If the 10-hour half reduction period is less than 40° C., polymerization is initiated during a process of impregnating ethylene polymer with vinyl monomers.

The term "10-hour half reduction period temperature", refers to a temperature at which a polymerization initiator is decomposed by 50% when 10 hours have passed at a certain temperature after 0.1 mol of the polmerization initiator is added to one liter of benzene.

Specific examples of such radical polymerization initiators are di-isopropylperoxy dicarbonate (40.5° C.), di-n-propylperoxy dicarbonate (40.5° C.), dimyristylperoxy dicarbonate (40.9° C.), di-(2-ethoxyethyl) peroxy dicarbonate (43.4° C.), di(methoxyisopropyl) peroxy dicarbonate (43.5° C.), di(2-ethylhexyl) peroxy dicarbonate (43.5° C.), t-hexylperoxyneodecanoate (44.7° C.), di(3-methyl-3-methoxybutyl) peroxy dicarbonate (46.5° C.), t-butylperoxyneodecanoate (46.50° C.), t-hexylperoxyneohexanoate (51.3° C.), t-butylperoxyneohexanoate (53° C.), 2, 4-dichlorobenzoyl peroxide (53° C.), t-hexylperoxypivalate (53.2° C.) t-butylperoxypivalate (55° C.), 3, 5, 5-trimethylhexanoyl peroxide (59.5° C.), octanoyl peroxide (62° C.), lauroyl peroxide (62° C.), cumylperoxy octoate (65.1° C.), acetyl peroxide (68° C.), t-butylperoxy-2-ethylhexanoate (72.5° C.), m-toluoyl peroxide (73° C.), benzoyl peroxide (74° C.), t-butylperoxy isobutylate (78° C.), 1, 1-bis (t-butylperoxy) -3, 5, 5-triethylcyclohexane (90° C.), (Figures in parentheses represent 10-hour half reduction period temperature.)

The radical polymerization initiator is used in an amount of 0.01 to 5 parts by weight, preferably 0.01 to 2.5 parts by weight, with respect to 100 parts by weight of the sum of the vinyl monomer and the radical polymerizable organic peroxide.

If the amount used is less than 0.01 parts by weight, perfect polymerization of the vinyl monomer and the radical polymerizable organic peroxide can not be obtained. If the amount exceeds 5% weight, crosslinking of ethylene polymers is apt to occur during polymerization and induced decomposition of radical polymerizable organic peroxide is apt to occur.

In the preparation of the graft polymerization precursor according to the invention, polymerization is done by the usual water suspension polymerization process. Thus, ethylene polymer and a solution prepared separately by agitatedly dispersing a radical polymerization initiator and radical polymerizable organic peroxide in vinyl monomer in water in the presence of a suspension agent used for water suspension polymerization, e.e., a water-soluble polymer such as polyvinyl alcohol, polyvinyl pyrrolidone and methyl cellulose and water-insoluble inorganic compounds such as calcium phosphate and magnesium oxide.

The concentration of the water suspension may be set as desired. Usually, however, the proportion of the reaction components is 5 to 150 parts by weight with respect to 100 parts by weight of water.

According to the invention, the impregnation of ethylene polymer with the solution noted above is suitably done at as high a temperature as possible. However, when the polymerization commences with the decomposition of the radical polymerization initiator at the time of the impregnation, the composition of the graft polymerization precursor that is formed becomes very non-homogeneous. Therefore, the impregnation is usually suitably done at a temperature lower by 5° C. or more than the 10-hour half reduction period temperature of the radical polymerization initiator used.

The sum of free vinyl monomer, radical polymerization organic peroxide and radical polymerization initiator after the impregnation should be less than 50% by weight. Preferably less than 20% by weight, with respect to their initial amount used. If the sum exceeds 50% by weight, the grafting capacity of the graft polymerization precursor according to the invention is extremely reduced. The amounts of free vinyl monomer, radical polymerizable organic peroxide and radical polymerization initiator are calculated by sampling a given quantity of the water suspension, quickly filtering the sampled liquid using a metal filter of about 300 mesh to separate ethylene polymer and liquid phase and measuring the quantities of vinyl monomer, radical polymerizable organic peroxide and radical polymerization initiator in the liquid phase.

In the preparation of the graft polymerization precursor according to the invention, the polymerization is usually done at a temperature of 30° to 110° C. This is done in order to prevent the decomposition of the radical polymerizable organic peroxide during the polymerization.

If the temperature exceeds 110° C., the amount of decomposition of the radical polymerizable organic peroxide is increased, which is undersired. The polymerization period is usually suitably 2 to 20 hours.

In the graft polymerization precursor according to the invention, the mixed vinyl polymer should contain 0.01 to 0.73% by weight of active oxygen.

If the content of active oxygen is less than 0.01% by weight, the grafting capacity of the graft polymerization precursor is extremely reduced.

If the content exceeds 0.73% by weight, the gel formation capacity is increased, which is also undesired.

The active oxygen content can be calculated by extracting vinyl polymer from the graft polymerization precursor according to the invention by solvent extraction and obtaining the active oxygen content of the vinyl polymer by the iodometric method.

The graft resin composition according to the invention is obtained through grafting reaction of either the afore-noted graft polymerization precursor alone or a mixture of the graft polymerization precursor and a polymer noted below caused by kneading the system in a molten state at a predetermined temperature.

The polymer noted above, which is used to form a mixture with the graft polymerization precursor in accordance with the invention, is suitably the same as what is used for the manufacture of the graft polymerization precursor, that is, it is a polymer consisting of either one or both of ethylene polymer and vinyl polymer.

For example, where the ethylene polymer in the graft polymerization precursor is low-density ethylene polymer, the polymer is suitably of the same monomer composition or density. If the monomer composition or density is different, the kneading is insufficient, so that the mechanical strength and appearance of the obtained graft resin composition is deteriorated. Even in the case of other ethylene polymers the same monomer composition is preferred for the same reason.

The vinyl polymer which is used to form mixture with the graft polymerization precursor, is obtained through polymerization of one or more vinyl monomers used for the manufacture of the graft polymerization precursor including aromatic vinyl monomers, e.g., styrene, nucleus-substituted styrene, e.g., methyl styrene, dimethyl styrene, ethyl styrene, isopropylstyrene and chlorastyrene α-substituted styrene, e.g., α-methyl styrene and α-ethyl styrene, (meth) acrylate ester monomer, e.g., alkyl ester with a (meth) acrylate carbon number of 1 to 7, (meth) acrylonitrile, and vinyl ester monomer, e.g., vinyl acetate and vinyl propyonate. Preferably, the vinyl polymer has the same monomer composition as the vinyl polymer in the graft polymerization precursor. If the monomer composition is different, the kneading is insufficient, and deterioration of the mechanical strength and appearance of the resultant graft resin composition is apt to occur.

The graft resin composition according to the invention, which is used as a mixture, is constituted by 1 to 99% of graft polymerization precursor and 9 to 1% by weight of polymer. If the graft polymerization precursor is less than 1% by weight, that is, if the polymer exceeds 99% by weight, the amount of the graft polymerization precursor in the graft resin composition becomes insufficient, and laminar separation is liable to result.

In the manufacture of the graft resin composition according to the invention, the grafting reaction is caused by kneading the system in a molten state at 100° to 300° C. If the temperature is below 100° C., the melting is insufficient, and the kneading is difficult, and the decomposition of the radical polymerizable organic peroxide in the graft polymerization precursor requires long time. If the temperature exceeds 300° C., molecular decomposition of the graft polymerization precursor will occur.

According to the invention, the kneading is necessary for maintaining the homogenity of the graft resin composition and controlling the grain size of the dispersed phase.

Particularly, when the temperature of the grafting reaction at the time of the manufacture of the graft resin composition exceeds 200° C., aggregation of the dispersed phase is liable to occur. Such aggregation can be prevented by kneading.

The grafting reaction period at the time of the manufacture of the graft polymerization precursor varies with the temperature, but usually it is within one hour. The thermal melting and kneading of the grafting reaction is done using an extruder, an injection molding machine, a mixer, etc.

EFFECT OF THE INVENTION

According to the invention, the graft resin composition can be obtained, and the proportions of kneading may be changed by merely changing the proportions. Further, the graft resin composition obtainable according to the invention has higher graft polymerization precursor than in the prior art products. Therefore, it is possible to obtain a graft resin composition, which is less subject to the aggregation of vinyl polymer due to secondary machining and is useful as an adhesive, coating agent, character improver, microdispersion promoter, polymer alloy formation agent, functional molding material, agent for imparting solubility to polymer, etc.

Now, examples are given so that the invention can be understood in further detail.

EXAMPLE 1

2,500 g of pure water was charged into a stainless steel autoclave with a volume of 5.1 and 2.5 g of polyvinyl alcohol was dissolved as a suspension agent.

Further, 700 g of low density ethylene polymer with a density of 0.925 g/cm (available under a trade mark "Sumikathene G-401", by Sumitomo Chemical Co., Ltd., with grain size of 3 to 4 mm) was charged and dispersed by agitation. Separately, 1.5 g of benzoyl peroxide (available under a trade mark "Nyper-B" by Nippan Oil & Fats Co., Ltd., with a 10-hour half reduction period temperature of 74° C.) as radical polymerization initiator and 6 g of t-butylperoxymethacryloyloxyethyl carbonate as radical polymerizable organic peroxide were dissolved in 300 g of vinyl monomer, and the resultant solution was charged into the autoclave, and the resultant solution was agitated.

Then, the autoclave was heated to elevate its temperature to 60° to 65° C., and the system was agitated for one hour, whereby the low density ethylene polymer was impregnated with the vinyl monomer containing the radical polymerization initiator and radical polymerizable organic peroxide. Subsequently, after confirming that the content of free vinyl monomer, radical polymerizable organic peroxide and radical polymerization initiator was less than 50% by weight of the initial amount, the temperature was elevated to 80° to 85° C. and the system was held at this temperature for 7 hours to complete polymerization, followed by washing with water and drying to obtain a graft polymerization precursor.

The active oxygen content in the styrene polymer in this graft polymerization precursor was measured. It wasl 0.13% by weight. This graft polymerization precursor was subjected to extraction in Soxhlet extractor with xylene. Any insoluble part in xylene was not found.

Then, this graft polymerization precursor was subjected to grafting reaction by kneading it at 180° C. for 10 minutes using a "Laboplast Mill B-75 Type Mixer" (manufactured by Toyo Seiki Seisakusho Co., Ltd.) rotated at a rate of 50 rpm. The system obtained after this grafting reaction was subjected to extraction in a Soxhlet extractor with ethyl acetate to extract styrene polymer remaining without being grafted. Thus, the grafting efficiency of the styrene polymer was calculated to be 89% by weight. Further, extraction with xylene was conducted to find that the part insoluble to hot xylene was 17.5% by weight. Further, this insoluble part in xylene was analyzed by pyrolysis gas chromatography. The contents of low-density ethylene polymer and styrene polymer were 79.0 and 21.0% by weight, respectively.

EXAMPLES 2 to 4

Grafting reaction was caused in the same manner as in Example 1 except for that the kneeding temperature of the graft polymerization precursor was varied as in Table 1 for measuring the grafting efficiency of and insoluble part in xylene content in the styrene polymer. The results are shown in Table 1.

EXAMPLE 5

Grafting reaction was caused in the same manner as in Example 1 except for that a "Banbury Type Mixer" (manufactured by Toyo Seiki Seisakusho Co., Ltd.) was used in leiu of "Laboplast Mill B-75 Type Mixer" as the kneader. The grafting efficiency of and insoluble part in xylene of styrene polymer were 86 and 15.6% by weight.

EXAMPLE 6

Grafting reaction was caused in the same manner as in Example 1 except for that a single screw extruder (manufactured by Toyo Seiki Seisakusho Co., Ltd.) was used as the kneader. The grafting efficiency of and insoluble part in xylene content in styrene polymer were 80 and 20% by weight.

EXAMPLE 7

Grafting reaction was caused in the same manner as in Example 1 except for that low-density ethylene polymer was used by 500 g, benzoyl pentoxide by 2.5 g, t-butylperoxymethacryloylxyethyl carbonate by 10 g and styrene by 500 g, thus preparing the graft polymerization precurser. As a result, the grafting efficiency and insoluble part in xylene of styrene polymer were 82 and 23% weight, respectively.

EXAMPLE 8

The graft polymerization precursor was manufactured for grafting reaction in the same manner as in Example 1 except for that styrene was used by 300 g and methyl methacrylate by 300 g. The grafing efficiency of and insoluble part in xylene content in methyl methacrylate polymer were 64 and 22% by weight, respectively.

EXAMPLE 9

A graft polymerization preformer was manufactured for grafting reaction in the same manner as in Example 1 except for that a mixture monomer consisting of 10 g of styrene and 90 g of acrylonitrile was used in lieu of 300 g styrene. The grafting efficiency of and insoluble part in xylene of styrene-acrylonitrile copolymer were 58 and 28% by weight, respectively.

EXAMPLE 10

A graft polymerization precursor was manufactured for grafting reaction in the same manner as in Example 1 except for that a mixture monomer consisting of 210 g of styrene and 90 g of n-butyl-acrylate was used in lieu of 300 g of styrene. The grafting efficiency of and insoluble part in xylene content in styrene-n-butyl-acrylate were 62 and 23% by weight, respectively.

EXAMPLE 11

A graft polymerization precursor was manufactured for grafting reaction in the same manner as in Example 1 except for that 300 g of vinyl acetate was used in lieu of 300 g of styrene and 6 g of t-butyl peroxyallylcarbonate in lieu of 6 g of t-butylperoxymethacryloyloxyethylcarbonate. The grafting efficiency of and insoluble part in xylene content in vinyl acetate polymer were 69 and 29% by weight respectively.

EXAMPLE 12

A graft polymerization precursor was manufactured for grafting reaction in the same manner as in Example 1 except for that powdery low-density ethylene polymer (available under a trade name "Flothene G-401" (manufactured by Seitetsu Kagaku Kogyo Co., Ltd. with a density of 0.925 g/cm) was used in lieu of low-density ethylene polymer. The grafting efficiency of and insoluble part in xylene content in styrene polymer were 85 and 13% by weight, respectively.

COMPARATIVE EXAMPLE 1

The graft polmerization precursor manufactured by in the same manner as in Example 1 was subjected to grafting reaction at 90° C. for one hour using a "Laboplastmill B-75 Type Mixer" at a rotating rate of 50 rpm. The system was not dissolved, so that it could not be kneaded.

The grafting efficiency of the styrene polymer was measured in the same manner as in Example 1.

It was 8% by weight, and the reaction was insufficient.

COMPARATIVE EXAMPLE 2

Grafting reaction was caused in the same manner as in Example 1.

The graft polymerization precursor was decomposed to result in coloring of the resin.

COMPARATIVE EXAMPLE 3

Grafting polymerization precursor was manufactured for grafting reaction in the same manner as in Example 1 except that t-butylperoxymethacryloyloxyethyl carbonate was not used. The grafting efficiency of and insoluble part in xylene content in styrene polymer were 7 and 3% by weight, respectively. The effect of t-butylperoxymethacryloyloxyethyl carbonate on grafting was clearly recognized.

EXAMPLE 13

A graft resin composition was obtained by causing grafting reaction in the same manner as in Example 1 except for that a mixture prepared by adding 50 g of powdery low-density ethylene polymer with a density of 0.925/cm to 50 g of powdery graft polymerization precursor prepared in the manner a in Example 1 and satisfactorily kneaded the mixture at room temperature.

The grafting efficiency of the styrene polymer was obtained with respect to this graft resin composition in the same manner as in Example 1.

It was 72% by weight.

The insoluble part in xylene content was 9.2% by weight.

Then, the graft resin composition was subjected to compression molding at 200° C. to obtain a plate having a thickness of 2 mm. The plate was uniformly white in color, and no phase separation was observed. By cutting the plate, no layer separation was observed.

EXAMPLE 14 to 17

Graft resin compositions were manufactured in the same manner as in Example 13 except for that the proportions of the graft polymerization precursor and low-density ethylene polymer were varied as in Table 2.

The grafting efficiency of an insoluble part in xylene content in of styrene polymer in the graft resin composition and the appearance of plate compression molded at 200° C. are as shown in Table 2.

EXAMPLE 18 to 20

Graft resin compositions were manufactured in the same manner as in Example 13 except for that the kneading temperature was varied as in Table 3.

The grafting efficiency of and insoluble part in xylene content in styrene polymer in the graft resin compositions and appearance of plate compression-molded at 200° C. are as shown in Table 3.

EXAMPLE 21

A graft polymerization precursor was manufactured in the same manner as in Example 13 except that a "Banbury Type Mixer" as in Example 5, was used in lieu of the "Laboplast Mill B-75 Type Mixer" as the kneader.

The grafting efficiency of and insoluble part in xylene content in styrene polymer in the graft resin composition were 78 and 9.2% by weight, respectively.

A plate of the graft resin composition was formed by compression molding at 200° C., and it had neither phase separation nor layer separation.

EXAMPLE 22

A graft resin composition was manufactured in the same manner as in Example 13 except that a single screw extruder was used as the kneader as in Example 6.

The grafting efficiency of and insoluble part in xylene content were 68 and 13.1% by weight, respectively. A plate of this graft resin composition obtained by compression molding at 200° C. had neither phase separation nor layer separation.

EXAMPLE 23

Graft resin composition was manufactured in the same manner as in Example 13 except that 50 g of styrene polymer (available under a trade name Mitsubishi Monsant Chemical Co., Ltd.) was used as vinyl polymer in lieu of 50 g of low-density ethylene polymer as mixture.

With the graft resin composition, the styrene polymer seems to be a matrix. Therefore, it is thought to be more suitable to obtain the grafting efficiency of the low-density ethylene polymer. Unfortunately, however, there is no suitable measuring method. Therefore, the grafting efficiency of the styrene polymer with respect to the low-density styrene polymer was obtained in the same manner as in Example 1.

The grafting efficiency of and insoluble part in xylene content in styrene polymer were 20 and 2.8% by weight. A plate of this graft resin composition obtained in the same manner as in Example 13 had neither phase separation nor layer separation.

EXAMPLE 24 to 27

Graft resin compositions were manufactured in the same manner as in Example 13 except that the proportions of the graft polymerization precursor and styrene polymer were varied as in Table 4.

The grafting efficiency of and insoluble part in xylene content in styrene polymer in the graft resin composition and appearance of plate of the composition formed by compression molding at 200° C. content was 0.1% weight.

Plate formed by compression molding in the manner as in Example 13 had no phase separation, and also its broken surface had large layer separation.

COMPARATIVE EXAMPLE 5

Grafting reaction was caused in the same manner as in Example 13 except for that the temperature of kneading of the graft polymerization precursor and polymer was set to 90° C.

However, kneading in the molten state was impossible due to low kneading temperature.

COMPARATIVE EXAMPLE 6

Grafting reaction was caused in the same manner as in Example 13 except for that the temperature of kneading of the graft polymerization precursor and polymer was set to 320° C.

During the grafting reaction, the resin was decomposed, and the resultant graft resin composition had brown color.

COMPARATIVE EXAMPLE 7

Grafting reaction was caused in the same manner as in Example 13 except for that the graft polymerization precursor was manufactured without use of t-butylperoxymethacryloyloxyethyl carbonate.

The grafting efficiency of and insoluble part in xylene content in styrene polymer were 7 and 2.8% by are as shown in Table 4.

As shown in Examples 26 and 27, when the styrene polymer was the matrix, the calculated grafting efficiency of the styrene polymer with respect to the low-density ethylene polymer is low, but the low-density ethylene polymer which is the dispersed phase seems to be grafted with a considerable high efficiency to the styrene polymer.

EXAMPLE 28 to 31

Graft polymerization preformers were manufactured in the same manner as in Example 13 except that 700 g of low-density ethylene polymer used for the manufacture of the graft polymerization precursor was used in lieu of 500 g, 300 g of styrene in lieu of 500 g, 1.5 g of benzoyl peroxide in lieu of of 2.5 g and 6 of t-butylperoxymethacryloyloxyethyl carbonate in lieu of 1 g.

Then, graft resin compositions were manufactured in the same manner as in Example 13 except for that the amount the graft polymerization precursor, low-density ethylene polymer and styrene polymer were varied as in Table 5.

EXAMPLE 32 to 36

A graft polymerization precursor was manufactured in the same manner as in Example 13 except that 300 g of methyl methacrylate was used in lieu of 300 g of styrene and 0.6 g of n-dodecylmercaptan was used additionally.

Then, graft resin compositions were manufactured in the same manner as in Example 13 except that the amounts of the graft polymerization precursor, low density ethylene polymer and methyl methacrylate polymer (available under a trade name "Delpet 50N" manufactured by Asahi Chemical Co., Ltd.) Table 6 shows test results.

EXAMPLE 37 to 41

A graft polymerization precursor was manufactured in the same manner as in Example 13 except for that a mixture ofmonomers consisting of 210 g of styrene, 90 g of acrylonitrile and 0.6 g of n-dodecylmercaptan as, molecular weight adjuster was used in lieu of 300 g of styrene.

Separately, acrylonitrile-styrene copolymer was obtained by adding a mixture solution consisting of 70 g of styrene, 30 g of acrylonitrile, 0.2 g of n-dodecylmercaptan and 0.5 g of benzoylperoxide to 500 g of an aqueous solution containing 1% of polyvinyl alcohol and holding the resultant admixture at 80° to 85° C. for 7 hours to complete polymerization.

Then, graft resin compositions were manufactured in the same manner as in Example 13 except that the amounts of acrylonitrile-styrene copolymer, graft polymerization precursor and low-density ethylene polymer were varied as shown in Table 7.

Test results are as shown in Table 7.

EXAMPLE 42

A graft polymerization precursor was manufactured in the same manner as in Example 13 except that a mixture monomer consisting of 210 g of methyl methacrylate and 90 g of n-butyl-acrylate was used in lieu of 300 g of styrene.

Then, a graft resin composition was manufactured in the same manner as in Example 13 except that 50 g of the graft polymerization precursor and 50 g of low-density ethylene polymer were used.

Thus, the grafting efficiency of and insoluble part in xylene content in methyl methacrylate-n-butyl-acrylate copolymer were 62 and 8.9% by weight, respectively.

Further, plate formed by compression molding in the same manner as in Example 13 had phase separation and layer separation.

EXAMPLE 43

A graft polymerization precursor was manufactured in the same manner as in Example 13 except that 300 g of vinyl acetate was used in lieu of 300 g of styrene and 6 g of t-butylperoxyallyl carbonate in lieu of 6 g of t-butylperoxymethacryloyloxyethyl carbonate.

Then, a graft resin composition was manufactured in the same manner as in Example 13 except that 50 g of this graft polymerization precursor and 50 g of low-density ethylene polymer were used.

The grafting efficiency was measured in the manner as in Example 13 except that methanol was used in lieu of ethyl acetate as extraction solvent. the grafting efficiency and insoluble part in xylene content in the vinyl acetate polymer were 73 and 16.3% by weight, respectively. A graft polymerization precursor was manufactured in the same manner as in Example 13 except that 50 g of the graft polymerization precursor and 50 g of low-density ethylene polymer were used.

Further, the grafting efficiency was measured by using methanol in lieu of ethyl acetate as extraction solvent in Example 13.

The grafting efficiency of and insoluble part in xylene content in vinyl acetate polymer were 73 and 6.3% by weight, respectively. Further, plate formed by compression molding in the manner as in Example 13 had neither phase separation nor layer separation.

EXAMPLE 44

A graft polymerization precursor was manufactured in the same manner as in Example 13. Then, a graft resin composition was manufactured in the same manner as in Example 13 except for that 50 g of "Sumikathene G-401" (a trade name by Sumitomo Chemical Co., Ltd. with a density of 0.010 g/cm) was mixed a low-density polymer kneaded as graft polymerization precursor was mixed with 50 g of the graft polymerization precurser.

At this time, the grafting efficiency and insoluble part in xylene content in the styrene polymer were 74 and 9.8% weight, respectively. Plate formed by compression molding in the same manner as in Example 13 had no phase separation, but slight layer separation was seen on the broken surface.

COMPARATIVE EXAMPLE 4

Then, a graft resin composition was manufactured in the same manner as in Example 13 except that 0.5 of the graft polymerization precursor, 50 g of low-density ethylene polymer and 49.5 g of "Dialex HF-55" used in Example 23 were mixed together.

The grafting efficiency of styrene polymer was 0.3% by weight, and the insoluble part in xylene weight, respectively.

However, plate formed by compression molding in the manner as in Example 13 had slight phase separation, and its broken surface had great layer separation.

In other words, the effect of t-butylperoxymethacryloyloxyethyl carbonate as grafting efficiency was clearly confirmed.

EXAMPLES 45 to 49

Graft polymerization preformers were obtained in the same manner as in Example 1 except that ethylene polymers shown in Table 8 were used in lieu of the low-density ethylene polymer as the ethylene polymer for the graft polymerization precursor, the impregnation was done for two hours in lieu of one hour and the polymerization temperature of 80° to 85° when manufacturing the graft polymerization precursor was varied as in Table 8.

Each of the graft polymerization precursors was subjected to extraction with ethyl acetate at room temperature for 7 days to obtain styrene polymer solution, which was charged into powdery styrene polymer.

The active oxygen content in the styrene polymer was measured in the same manner as in Example 1.

The results are as shown in Table 8.

Further, the insoluble part in xylene content was also measured to obtain results as shown in Table 8.

Further, grafting reaction of each graft polymerization precursor was caused in the same manner as in Example 1.

With each graft resin composition, the grafting efficiency and insoluble part in xylene content of styrene polymer were measured in the same manner as in Example 1.

The results are shown in Table 8.

By the term "grafting efficiency" is referred to the ratio of grafted polystyrene to the total polymerized.

EXAMPLES 50 to 53

Graft resin compositions were obtained in the same manner as in Example 1 except that the graft polymerization precursors obtained in Examples 45 to 48 were used and the kneading temperature was varied from 180° C. as shown Table 9 instead of 180° C.

With each graft resin composition, the grafting efficiency of and insoluble part in xylene content in styrene polymer were measured.

The results are as shown in Table 9.

EXAMPLES 54 to 57

Graft resin compositions were obtained by causing grafting reaction in the same manner as in Example 1 except for that the graft polymerization precursors obtained in Examples 45 to 48 were used and kneaders as shown in Table 10 were used as kneaders in lieu of "Laboplast Mill B-75 Type Mixer". With each graft resin composition, the grafting efficiency of and insoluble part in xylene content in styrene copolymer were measured.

The results are as shown in Table 10.

EXAMPLE 58 to 61

Graft polymerization preformers were manufactured in the same manner as in Example 1 except that the kind and proportion of ethylene polymer used for the preparation of the graft polymerization precursor and proportion of benzoyl peroxide, t-butylperoxymethacryloyloxyethyl carbonate and styrene were varied as in Table 11.

Graft resin compositions were obtained using these graft polymerization precursors in the same manner as in Example 1.

With each of the graft resin compositions, the grafting efficiency of and insoluble part in xylene content in styrene polymer were measured in the same manner as in Example 1.

The results are as shown in Table 11.

EXAMPLES 62 to 73

Graft polymerization precursors were obtained in the same manner as in Table 12 except that the proportions of ethylene polymer and styrene used in the manufacture of the graft polymerization precursors were varied as shown in Table 12.

Graft resin compositions were obtained using the individual graft polymerization precursors in the same manner as in Example 1.

With each of the graft resin compositions, the grafting efficiency of and insoluble part in xylene content in styrene polymer were obtained in the same manner as in Example 1.

The results are as shown in Table 12.

EXAMPLES 74 to 77

Graft polymerization precursor were manufactured in the same manner as in Example 1 except that the proportions of the ethylene, styrene and t-butylperoxymethacryloyloxyethyl carbonate used for the preparation of the graft polymerization precursor were varied as in Table 13.

Using these graft polymerization precursors graft resin compositions were obtained in the same manner as in Example 1.

With respect to each of these graft resin compositions, the grafting efficiency of and insoluble part in xylene content in the vinyl acetate copolymer were measured in the same manner as in Example 1.

The results are as shown in Table 13.

EXAMPLES 78 to 80

Graft polymerization precursors were obtained by causing grafting reaction in the same manner as in Example 1 except that the precursor was obtained by pulverizing epoxy-group-containing ethylene copolymer (Example 78), ethylene-ethyl acrylate copolymer (Example 79) or ethylene-vinly acetate copolymer (Example 80) in the frozen state in lieu of low-density ethylene polymer as ethylene polymer used for the preparation of the graft polymerization precursor.

The grafting efficiency of and insoluble part in xylene content in styrene polymer were as shown in Table 14.

EXAMPLE 81

A graft polymerization precursor was manufactured for grafting reaction in the same manner as in Example 45 except that a system consisting of 82% by weight of ethylene, 12% by weight of glycidyl methacrylate and 6% weight of vinyl acetate was used in lieu of the epoxy-group-containing copolymer.

The grafting efficiency of and insoluble part in xylene content in styrene polymer were 79.5 and 19.8% by weight.

EXAMPLE 82

A graft polymerization precursor was manufactured for grafting reaction in the same manner as in Example 46 except that a copolymer consisting of 95% by weight of ethylene and 5% by weight of ethyl acrylate (available under a trade name "Nisseki Lekusuron EEA A-3050" manufactured by Nippon Oil Co., Ltd.) was used in lieu of ethylene-ethyl acrylate copolymer.

The grafting efficiency of and insoluble part in xylene content in styrene polymer were 76.7 and 18.8% by weight, respectively.

EXAMPLE 83

A graft polymerization precursor was manufactured for grafting reaction in the same manner as in Example 47 except that a copolymer consisting of 72% by weight of ethylene and 28% by weight of vinyl acetate (available under a trade name "Evaflex 260" manufactured by Mitsui Polychemical Co., Ltd.) was used in lieu of ethylene-vinyl acetate copolymer.

The grafting efficiency and insoluble part in xylene content in styrene copolymer were 84.8 and 27.4% by weight, respectively.

COMPARATIVE EXAMPLES 8 to 11

The graft polymerization precursors used in Examples 45 to 49 were subjected to grafting reaction at 90° C. for one hour using a "Laboplast Mill B-75 Type Mixer" at a rotational speed of 50 RPM. The system was not molten, so that it could not be kneaded.

The grafting efficiency of styrene polymer was measured in the same manner as in Example 1.

It was 6.2% by weight in Comparative Example 8, 3.1% by weight in Comparative Examples 9, 4.7% by weight in Comparative Example 10 and 2.7% by weight in Comparative Example 10, so that it was insufficient.

COMPARATIVE EXAMPLES 12 to 15

Grafting reaction was caused in the same manner as in respective Comparative Examples 8 to 11 except that the temperature of the grafting reaction was varied from 90° C. to 320° C. As a result, decomposition of the graft polymerization precursor occurred, and the resin was colored.

COMPARATIVE EXAMPLES 16 to 19

Grafting reaction was caused in the same manner as in Examples 45 to 48 except that t-butylperoxymethacryloyloxyethyl carbonate was not used. With the epoxy-group-containing ethylene copolymer (Comparative Example 16), the grafting efficiency of and insoluble part in xylene content in the styrene polymer were 3.2 and 0% by weight, respectively. With ethylene-ethyl acrylate copolymer (Comparative Example 17), they were 1.2 and 0% by weight, respectively.

With ethylene-vinyl acetate copolymer (Comparative Example 18), they were 1.9 and 0% by weight, respectively. With ethylene-propylene-diene copolymer (Comparative Example 19), they were 0.6 and 0% by weight, respectively.

Thus, the effect of t-butylperoxymethacryloyloxyethyl carbonate on grafting was clearly confirmed.

EXAMPLES 84 to 88

Graft polymerization precursors were obtained through grafting reaction caused in the same manner as in Example 13 except that 50 g of ethylene copolymer as shown in Table 15 was added to 50 g of powdery graft polymerization precursors obtained in Examples 45 to 49.

The grafting efficiency of and insoluble part in xylene content in styrene polymer of these graft polymerization precursors were as shown in Table 15.

Plate with a thickness of 2 mm manufactured using these graft resin compositions in the same manner as in Example 13.

These plates were all uniformly white in color and had no recognizable phase separation. Further, no layer separation was recognized in any of their broken surfaces.

EXAMPLES 89 to 92

Graft resin compositions were manufactured in the same manner as in respective Examples 84 to 87 except that the mixed amounts of the graft polymerization precursor and ethylene copolymer for the preparation of the graft polymerization precursor were varied as in Table 16 to 19.

The styrene polymer grafting efficiency and insoluble part in xylene content of the resultant graft resin compositions as well as the appearance of plate formed by compression molding at 200° C. are as shown in Tables 16 to 19.

EXAMPLES 93 to 96

Graft resin compositions were manufactured in the same manner as in respective Examples 84 to 87 except that the kneading temperature was set as in Table 20 instead of 180° C.

The styrene polymer grafting efficiency and insoluble part in xylene content of the graft resin composition and appearance of plate formed by compression molding at 200° C. are as shown in Table 20.

EXAMPLES 97 to 100

Graft polymerization precursors were manufactured in the same manner as in respective examples 84 to 87 except that a "Laboplast Mill B-75 Type Mixer" was replaced with kneaders as shown in Table 21.

The characteristics of the graft resin composition and appearance of the plate formed by compression molding are as shown in Table 21.

EXAMPLES 101 to 104

Graft resin compositions were manufactured in the same manner as in Examples 84 to 87 except that styrene available under a trade name "Dialex HF-55", manufactured by Mitsubishi Monsanto Chemical Co., Ltd.) was used as vinyl polymer in lieu of the ethylene copolymer to be mixed with the graft polymerization precursor.

The characteristics of the graft resin composition and appearance of plate formed by compression molding are as shown in Table 22.

EXAMPLES 105 to 108

Graft resin compositions were manufactured in the same manner as in respective Examples 101 to 104 except that the mixed amounts of the graft polymerization precursor and styrene polymer were varied as in Tables 23 to 26.

The styrene polymer grafting efficiency and insoluble part in xylene content of the graft resin composition and appearance of plate formed by compression molding 200° C. are as shown in Tables 23 to 26.

EXAMPLES 109 to 112

Graft polymerization precursors were manufactured in the same manner as in Examples 84 to 87 except that 500 g of ethylene copolymer was used instead of 700 g, 500 g of styrene instead of 300 g, 2.5 g of benzoyl peroxide instead of 1.5 g and 9 g of t-butylperoxymethacryloyloxyethyl carbonate instead of 6 g for the preparation of the graft polymerization precursor. Then, graft resin compositions were prepared in the same manner as in Examples 84 to 87 except that the proportions of the graft polymerization precursor, ethylene copolymer and styrene were varied as in Tables 27 to 30.

The styrene polymer grafting efficiency and insoluble part in xylene content of these graft resin compositions and appearance of plate formed by compressions molding at 200° C. are as shown in Table 27 to 30.

EXAMPLES 113 to 116

Graft polymerization precursors were prepared in the same manner as in respective Examples 84 to 87 except that methyl methacrylate was used in lieu of styrene used for the preparation of the graft polymerization precursor and 0.6 g of n-dodecyl mercaptan was additionally added as a molecular weight adjusting agent.

Graft polymerization precursors were manufactured in the same manner as in Examples 84 to 87 except that the amounts of the graft polymerization precursor, ethylene copolymer and methyl methacrylate polymer (available under a trade name "Delpet 50N" manufactured by Asahi Kasei Chemical Industry Co., Ltd.) were varied as in Tables 31 to 34. The results are as shown in Tables 31 to 34.

EXAMPLES 117 to 120

Graft polymerization precursors were manufactured in the same manner as in Examples 84 to 87 except that a monomer mixture consisting of 210 g of styrene and 90 g of acrylonitrile was used in lieu of 300 g of styrene, and 0.6 g of n-dececyl mercaptan was used as a molecular weight adjusting agent. Separately, acrylonitrile-styrene copolymer was prepared by adding 70 g of styrene, 30 g of acrylonitrile, 0.2 g of n-dodecyl mercaptan and 0.5 g of benzoyl peroxide to 500 g of a water solution containing 1% polyvinyl alcohol and holding the resultant admixture at a temperature of 80° to 85° C. for 7 hours to complete the polymerization. Graft resin compositions were manufactured in the same manner as in Examples 84 to 87 except that the amounts of this copolymer and the graft polymerization precursor and ethylene copolymer noted above as in Tables 35 to 38. The results are as shown in Tables 35 to 38.

EXAMPLES 121 to 124

Graft polymerization precursors were manufactured in the same manner as in Examples 84 to 87 except that a mixture monomer consisting of 210 g of ethyl methacrylate and 90 g of n-butyl-acrylate was used in lieu of 300 g of styrene. Then, graft resin compositions were manufactured in the same manner as in Examples 84 to 87 except that 50 g of the graft polymerization precursor and 50 g of ethylene copolymer as shown in the Table 39 below were used. The results are as shown in Table 39.

EXAMPLES 125 to 128

Graft polymerization precursors were manufactured in the same manner as in Examples 84 to 87 except that 300 g of vinyl acetate was used in lieu of 300 g of styrene and 6 g of t-butylperoxymethacryloyloxyethyl carbonate was used in lieu of 6 g of t-butylperoxyethyl carbonate. Then, graft resin compositions were manufactured in the same manner as in respective Examples 84 to 87 except that there were used 50 g of the graft polymerization precursor and 50 g of the same ethylene copolymer as used for the graft polymerization precursor.

Further, the grafting efficiency was measured by using methanol in lieu of ethyl acetate as extraction solvent.

The results are as shown in Table 40.

EXAMPLE 129

A graft polymerization precursor was manufactured in the same manner as in Example 84. Then, a graft resin composition was manufactured in the same manner as in Example 84 except that 50 g of a copolymer consisting of 82% by weight of ethylene, 12% by weight of glycidyl methacrylate and 6% by weight of vinyl acetate was mixed as an epoxy-group-containing ethylene copolymer and kneaded with 50 g of the graft polymerization precursor.

In this case, the styrene polymer grafting efficiency and insoluble part in xylene content were 55.5 and 14.5% by weight, respectively. Plate compression-molded in the same manner as in Example 84 had no phase separation, but its broken surface had a trace of layer separation.

EXAMPLE 130

A graft resin composition was manufactured in the same manner as in Example 85 except that a copolymer consisting of 95% by weight of ethylene and 5% by weight of ethyl acrylate (available under a trade name "Nisseki Leksron EEA A-3050" manufactured by Nippon Petrochemicals Co., Ltd.) was used in lieu of ethylene-ethyl acrylate copolymer. The grafting efficiency and insoluble part in xylene content were 9.5 and 9.7% by weight, respectively.

EXAMPLE 131

A graft resin composition was manufactured in the same manner as in Example 86 except that a copolymer consisting of 72% by weight of ethylene and 28% by weight of vinyl acetate was used in lieu of ethylene-vinyl acetate copolymer. The grafting efficiency and insoluble part in xylene content were 53.5 and 10.5% by weight, respectively.

COMPARATIVE EXAMPLES 20 TO 23

Graft polymerization precursors were manufactured in the same manner as in respective Examples 84 to 87. Then, graft resin compositions were manufactured in the same manner as in Examples 84 to 87 by mixing 0.5 g of the graft polymerization precursor, 50 g of the same copolymer used for that preparation of each of the graft polymerization precursors and 49.5 g of the same styrene polymer used in Example 10. The grafting efficiency of the styrene polymer was 0.3, 0.4, 0.9 and 0.7% by weight, respectively. The insoluble part in xylene content was 0.1, 0.4, 0.3 and 0.2% by weight, respectively. Further, plate formed by compression molding had phase separation, and also its broken surface had great layer separation.

COMPARATIVE EXAMPLE 24 TO 27

Grafting reaction was caused in the same manner as in Examples 84 to 87 except that the temperature of kneading of the graft polymerization precursor and ethylene copolymer was set to 90° C. However, kneading in the molten state was impossible because of low kneading temperature.

COMPARATIVE EXAMPLES 28 TO 31

Grafting reaction was caused in the same manner as in Examples 84 to 87 except that the temperature of kneading of the graft polymerization precursor and ethylene copolymer was set to 320° C. As a result, each resin was decomposed during the grafting reaction, and the obtained resin composition was brown in color.

COMPARATIVE EXAMPLES 32 TO 35

Grafting reaction was caused in the same manner as in Examples 84 to 87 except that the respective graft polymerization precursors were manufactured without use of t-butylperoxymethacryloyloxyethyl carbonate. As a result, the grafting efficiency of the styrene polymer was 0.1, 0.2, 0 and 0% by weight, respectively, and the insoluble part in xylene content was 0% by weight in all cases. Further, plate formed by compression molding had phase separation, and its broken surface had great layer separation. From this fact, the effect of t-butylperoxymethacryloyloxyethyl carbonate on grafting was clearly confirmed.

TABLE 1

|  | Example No. | | | |
| --- | --- | --- | --- | --- |
|  | 1 | 2 | 3 | 4 |
| Kneading temperature (°C.) | 180 | 140 | 220 | 260 |
| Grafting efficiency of styrene polymer (% by weight) | 89 | 90 | 75 | 47 |
| Insoluble part in Xylene (% by weight) | 17.5 | 12 | 32 | 29 |

TABLE 2

| | | Example No. | | | | |
| --- | --- | --- | --- | --- | --- | --- |
| | | 13 | 14 | 15 | 16 | 17 |
| Proportions (g) | Graft polymerization precursor | 50 | 95 | 75 | 25 | 5 |
| | Low density ethylene polymer | 50 | 5 | 25 | 75 | 95 |
| Characteristics (% by weight) | Grafting efficiency of styrene polymer | 72 | 75 | 81 | 79 | 71 |
| | Insoluble part in xylene | 9.7 | 18.2 | 15.7 | 8.5 | 4.7 |
| Appearance of compression-molded plate | Phase separation | None | None | None | None | None |
| | Layer separation | None | None | None | None | None |

TABLE 3

| | | Example No. | | | |
| --- | --- | --- | --- | --- | --- |
| | | 13 | 18 | 19 | 20 |
| Kneading temperature (°C.) | | 80 | 140 | 220 | 260 |
| Characteristics (% by weight) | Grafting efficiency of styrene polymer | 72 | 77 | 68 | 55 |
| | Insoluble part in xylene | 9.7 | 9.0 | 19.2 | 23.2 |
| Appearance of compression-molded plate | Phase separation | None | None | None | None |
| | Layer separation | None | None | None | None |

TABLE 4

| | | Example No. | | | | |
|---|---|---|---|---|---|---|
| | | 23 | 24 | 25 | 26 | 27 |
| Proportions (g) | Graft polymerization precursor | 50 | 95 | 75 | 25 | 5 |
| | Styrene polymer | 50 | 5 | 25 | 75 | 95 |
| Characteristics (% by weight) | Grafting efficiency of styrene polymer | 20.3 | 72.3 | 37.1 | 7.5 | 1.4 |
| | Insoluble part in xylene | 2.8 | 17.9 | 10.1 | 1.7 | 0.2 |
| Appearance of compression-molded plate | Phase separation | None | None | None | None | None |
| | Layer separation | None | None | None | None | None |

TABLE 5

| | | Example No. | | | |
|---|---|---|---|---|---|
| | | 28 | 29 | 30 | 31 |
| Proportions (g) | Graft polymerization precursor | 30 | 30 | 20 | 20 |
| | Styrene polymer | 40 | 30 | 50 | 30 |
| | Low density ethylene polymer | 30 | 40 | 30 | 50 |
| Characteristics (% by weight) | Grafting efficiency of Styrene polymer | 22.4 | 27.1 | 11.8 | 21.5 |
| | Insoluble part in xylene | 7.1 | 6.5 | 6.7 | 7.8 |
| Appearance of compression-molded plate | Phase separation | None | None | None | None |
| | Layer separation | None | None | None | None |

TABLE 6

| | | Example No. | | | | |
|---|---|---|---|---|---|---|
| | | 32 | 33 | 34 | 35 | 36 |
| Proportions (g) | Graft polymerization precursor | 50 | 50 | 50 | 30 | 30 |
| | Methyl methacrylate polymer | 50 | — | 25 | — | 35 |
| | Low density ethylene polymer | — | 50 | 25 | 70 | 35 |
| Characteristics (% by weight) | Grafting efficiency of methyl methacrylate polymer | 14.2 | 68.2 | 25.8 | 66.5 | 13.1 |
| | Insoluble part in xylene | 7.2 | 8.3 | 8.1 | 9.3 | 7.8 |
| Appearance of compression-molded plate | Phase separation | None | None | None | None | None |
| | Layer separation | None | None | None | None | None |

TABLE 7

| | | Example No. | | | | |
|---|---|---|---|---|---|---|
| | | 37 | 38 | 39 | 40 | 41 |
| Proportions (g) | Graft polymerization precursor | 50 | 50 | 50 | 30 | 30 |
| | Acrylonitrile-styrene copolymer | 50 | — | 25 | — | 35 |
| | Low-density ethylene polymer | — | 50 | 25 | 70 | 35 |
| Characteristics (% by weight) | Grafting efficiency of acrylonitrile-styrene copolymer | 18.9 | 82.1 | 30.8 | 80.9 | 16.8 |
| | Insoluble part in xylene | 5.3 | 10.3 | 9.1 | 12.5 | 9.6 |
| Appearance of compression-molded plate | Phase separation | None | None | None | None | None |
| | Layer separation | None | None | None | None | None |

TABLE 8

| | | Example No. | | | | |
|---|---|---|---|---|---|---|
| | | 45 | 46 | 47 | 48 | 49 |
| Graft polymerization precursor | Ethylene copolymer for graft polymerization precursor | Note 1 | Note 2 | Note 3 | Note 4 | Note 5 |
| | Polymerization temperature (°C.) | 80~85 | 75~80 | 75~80 | 75~80 | 75~80 |
| | Active oxygen content (% by weight) of styrene polymer | 0.13 | 0.13 | 0.12 | 0.13 | 0.13 |
| | Insoluble part in xylene content | — | — | — | — | — |
| Graft resin composi- | Grafting efficiency (% by weight) of styrene polymer | 77.1 | 80.3 | 81.0 | 83.0 | 76.8 |
| | Insoluble part in xylene | 19.3 | 22.3 | 23.7 | 17.2 | 14.6 |

TABLE 8-continued

| | Example No. | | | | |
|---|---|---|---|---|---|
| | 45 | 46 | 47 | 48 | 49 | tion

Note 1: Epoxy-group-containing ethylene copolymer (ethylene-glycidyl methacrylate copolymer, glycidyl methacrylate content: 15% by weight, pellet-like)
Note 2: Ethylene-ethyl acrylate copolymer (available under a trade name "Nisseki Rekusuron EEAA-4200" manufactured by Nippon Petrochemicals Co., Ltd., methyl acrylate content: 20% by weight, pellet-like)
Note 3: Ethylene-vinyl acetate copolymer (available under a trade name "Nisseki Rekusuron Eva V-270" manufactured by Nippon Petrochemicals Co., Ltd., vinyl acetate content: 15% by weight, pellet-like)
Note 4: Ethylene-propylene-diene copolymer rubber (available under a trade name "Mitsui Elastomer K9720" manufactured by Mitsui Petrochemical Industries, Ltd., Mooney viscosity (ML I + 4, 100° C.), iodization: 22, pellet-like)
Note 5: Ethylene-propylene copolymer rubber (available under a trade name "Mitsui EPT #0045" Mitsui Petrochemical Industries, Ltd., Mooney viscosity (ML I + 4, 100° C.): 40

TABLE 9

| | | Example No. | | | | | | | | | | | |
|---|---|---|---|---|---|---|---|---|---|---|---|---|---|
| | | 50 | | | 51 | | | 52 | | | 53 | | |
| Graft Polymerization Precursor (Example) Note 6 | | (45) | | | (46) | | | (47) | | | (48) | | |
| Graft resin composition | Kneading temperature (°C.) | 140 | 220 | 260 | 140 | 220 | 260 | 140 | 220 | 260 | 140 | 220 | 260 |
| | Grafting efficiency (% by weight) of styrene polymer | 42.1 | 71.5 | 59.4 | 46.8 | 76.5 | 63.8 | 48.7 | 79.1 | 58.6 | 46.4 | 81.7 | 51.9 |
| | Insoluble part in xylene (% by weight) | 3.7 | 20.1 | 22.3 | 13.3 | 20.6 | 16.5 | 14.7 | 22.2 | 17.1 | 13.9 | 24.1 | 15.7 |

Note: Graft polymerization precursor (ethylene copolymer used)
(Example 45) Epoxy-group-containing ethylene copolymer
(Example 46) Ethylene-ethyl acrylate polymer
(Example 47) Ethylene-vinyl acetate copolymer
(Example 48) Ethylene-propylene-diene copolymer rubber

TABLE 10

| | | Example No. | | | | | | | |
|---|---|---|---|---|---|---|---|---|---|
| | | 54 | | 55 | | 56 | | 57 | |
| Graft polymerization precursor (Example) Note 6 | | (45) | | (46) | | (47) | | (48) | |
| Graft resin composition | Kneader Note 7 | ① | ② | ① | ② | ① | ② | ① | ② |
| | Grafting efficiency (% by weight) of styrene polymer | 80.3 | 71.1 | 82.5 | 76.6 | 84.1 | 78.5 | 86.6 | 77.1 |
| | Insoluble part in xylene (% by weight) | 17.5 | 20.6 | 19.2 | 24.3 | 20.4 | 25.2 | 15.5 | 20.5 |

Note 6: The same as Table 9
Note 7: Kneader
① Banbury Type Mixer
② Single screw

TABLE 11

| | | | Example No. | | | | |
|---|---|---|---|---|---|---|---|
| | | | 1 | 58 | 59 | 60 | 61 |
| Graft polymerization precurser | Low-density ethylene polymer | Proportion (g) | 700 | | | | |
| | Epoxy-group-containing ethylene copolymer Note 1 | | | 500 | | | |
| | Ethylene-ethyl acrylate copolymer Note 2 | | | | 500 | | |
| | Ethylene-vinyl acetate copolymer Note 3 | | | | | 500 | |
| | Ethylene-propylene-diene copolymer | | | | | | 500 |
| | Benzoyl peroxide | | 1.5 | 2.5 | 2.5 | 2.5 | 2.5 |
| | t-butylperoxymethacryloyloxyethyl carbonate | | 6 | 10 | 10 | 10 | 10 |
| | Styrene | | 300 | 500 | 500 | 500 | 500 |
| Graft resin composition | Grafting efficiency (% by weight) of styrene polymer | | 89 | 73.1 | 82.1 | 82.8 | 86.3 |
| | Insoluble part in xylene (% by weight) | | 17.5 | 23.5 | 24.1 | 25.5 | 26.1 |

Notes 1 to 4 are the same as in Table 8.

TABLE 12

| | | | Example No. | | | | | | | | | | | | |
|---|---|---|---|---|---|---|---|---|---|---|---|---|---|---|---|
| | | | 1 | 62 | 63 | 64 | 65 | 66 | 67 | 68 | 69 | 70 | 71 | 72 | 73 |
| Graft polymerization precurser | Ethylene-polymer Note 8 | Proportion (g) | ① 700 | ② 700 | ② 700 | ② 700 | ③ 700 | ③ 700 | ③ 700 | ④ 700 | ④ 700 | ④ 700 | ⑤ 700 | ⑤ 700 | ⑤ 700 |
| | Styrene | | 300 | | 210 | 210 | | 210 | 210 | | 210 | 210 | | 210 | 210 |
| | Methyl acrylate | | | 300 | | | 300 | | | 300 | | | 300 | | |
| | Acrylonitrile | | | | 90 | | | 90 | | | 90 | | | 90 | |
| | n-butyl-acrylate | | | | | 90 | | | 90 | | | 90 | | | 90 |
| | Benzoyl peroxide | | 1.5 | 1.5 | 1.5 | 1.5 | 1.5 | 1.5 | 1.5 | 1.5 | 1.5 | 1.5 | 1.5 | 1.5 | 1.5 |
| | t-butylperoxymethacryloyloxy-ethyl carbonate | | 6 | 6 | 6 | 6 | 6 | 6 | 6 | 6 | 6 | 6 | 6 | 6 | 6 |
| Graft resin composition | Grafting Efficiency (% by weight) of styrene (mma) (co-and/or) copolymer Note 9 | | 89 | 68.8 | 73.7 | 81.5 | 72.5 | 74.6 | 83.1 | 76.7 | 79.1 | 80.5 | 74.7 | 80.5 | 84.2 |

TABLE 12-continued

| | Example No. | | | | | | | | | | | | |
|---|---|---|---|---|---|---|---|---|---|---|---|---|---|
| | 1 | 62 | 63 | 64 | 65 | 66 | 67 | 68 | 69 | 70 | 71 | 72 | 73 |
| Insoluble part in xylene | 17.5 | 12.3 | 19.3 | 23.2 | 14.2 | 19.7 | 25.3 | 18.5 | 20.5 | 22.7 | 20.0 | 18.3 | 22.2 |

Note 8:
① Low-density ethylene polymer
② Epoxy-group-containing copolymer
③ Ethylene-ethyl acrylate copolymer
④ Ethylene-vinyl acetate copolymer
⑤ Ethylene-propylene diene copolymer rubber
*② to ⑤ being specifically the same as in Table 8

Note 9:
As the styrene (MMA) polymer, there are styrene polymer, methyl methacrylate copolymer, styrene-acrylonitrile copolymer or styrene-n-butyl-acrylate copolymer

TABLE 13

| | | | | Example No. | | | | |
|---|---|---|---|---|---|---|---|---|
| | | | | | 1 | 74 | 75 | 76 | 77 |
| Graft polymerization precurser | Ethylene-polymer Note 8 | Proportion (g) | ① 700 | ② 700 | ③ 700 | ④ 700 | ⑤ 700 |
| | Styrene | | 300 | | | | |
| | Vinyl acetate | | | 300 | 300 | 300 | 300 |
| | t-butylperoxymethacryloyloxyethyl carbonate | | 6 | | | | |
| | t-butylperoxyallyl carbonate | | | 6 | 6 | 6 | 6 |
| Graft resin composition | Grafting efficiency of vinyl acetate (styrene) copolymer (% by weight) | | 89 | 75.7 | 77.5 | 81.2 | 86.7 |
| | Insoluble part in xylene (% by weight) | | 17.5 | 20.2 | 19.7 | 24.3 | 26.3 |

Note 8 is the same as in Table 12

TABLE 14

| | Example No. | | |
|---|---|---|---|
| Grafted Resin Composition | 78 | 79 | 80 |
| Grafting efficiency of styrene polymer (% by weight) | 84.3 | 85.5 | 84.6 |
| Insoluble part in xylene | 15.4 | 18.3 | 18.5 |

TABLE 15

| | | | Example No. | | | | |
|---|---|---|---|---|---|---|---|
| | | | | 84 | 85 | 86 | 87 | 88 |
| Graft polymerization precurser | Material (g) | Ethylene copolymer Note 9 | | | | | |
| | | Epoxy-group-containing ethylene copolymer | 700 | | | | |
| | | Ethylene-acrylate copolymer | | 700 | | | |
| | | Ethylene-vinyl acetate copolymer | | | 700 | | |
| | | Ethylene-propylene-diene copolymer rubber | | | | 700 | |
| | | Ethylene-propylene copolymer rubber | | | | | 700 |
| | | Styrene | 300 | 300 | 300 | 300 | 300 |
| | | Benzoyl peroxide | 1.5 | 1.5 | 1.5 | 1.5 | 1.5 |
| | | t-butylperoxymethacryloyloxyethyl carbonate | 6 | 6 | 6 | 6 | 6 |
| | | Graft polymerization precurser | 50 | 50 | 50 | 50 | 50 |
| Graft resin composition | Polymer (g) | Ethylene copolymer Note 9 | | | | | |
| | | Epoxy-group-containing ethylene copolymer | 50 | | | | |
| | | Ethylene-acrylate copolymer | | 50 | | | |
| | | Ethylene-vinyl acetate copolymer | | | 50 | | |
| | | Ethylene-propylene-diene copolymer | | | | 50 | |
| | | Ethylene-propylene copolymer rubber | | | | | 50 |
| | Kneading temperature (°C.), (minutes) | | 180,10 | 180,10 | 180,10 | 180,10 | 180,10 |
| | Characteristics | Grafting efficiency (% by weight) of styrene polymer | 57.3 | 55.3 | 56.7 | 54.7 | 50.6 |
| | | Insoluble part in xylene (% by weight) | 14.1 | 12.5 | 13.8 | 10.3 | 8.3 |

Note 9 is the same as in Notes 1 to 5 in Table 8

TABLE 16

| Example No. | | 89 | | | |
|---|---|---|---|---|---|
| Proportions (g) | Graft polymerization precursor | 95 | 75 | 25 | 5 |
| | Epoxy-group-containing olefin copolymer | 5 | 25 | 75 | 95 |
| Characteristics (% by weight) | Grafting efficiency of styrene polymer | 55.1 | 58.1 | 63.1 | 80.1 |
| | Insoluble part in xylene | 10.3 | 15.3 | 8.9 | 1.5 |
| Appearance of compression-molded plate | Phase seperation | None | None | None | None |
| | Layer seperation | None | None | None | None |

TABLE 17

| Example No. | | 90 | | | |
|---|---|---|---|---|---|
| Proportions | Graft polymerization precursor | 95 | 75 | 25 | 5 |

TABLE 17-continued

| Example No. | | 90 | | | |
|---|---|---|---|---|---|
| (g) | Ethylene ethylacrylate copolymer | 5 | 25 | 75 | 95 |
| Characteristics (% by weight) | Grafting efficiency of styrene polymer | 59.1 | 62.4 | 68.8 | 85.4 |
| | Insoluble part in xylene | 9.5 | 15.3 | 6.7 | 1.2 |
| Appearance of compression-molded plate | Phase seperation | None | None | None | None |
| | Layer separation | None | None | None | None |

TABLE 18

| Example No. | | 91 | | | |
|---|---|---|---|---|---|
| Proportions (g) | Graft polymerization precurser | 95 | 75 | 25 | 5 |
| | Ethylene-vinyl acetate copolymer | 5 | 25 | 75 | 95 |
| Characteristics (% by weight) | Grafting efficiency of styrene polymer | 63.2 | 66.7 | 72.9 | 79.1 |
| | Insoluble part in xylene | 14.3 | 16.0 | 8.1 | 2.4 |
| Appearance of compression-molded plate | Phase seperation | None | None | None | None |
| | Layer seperation | None | None | None | None |

TABLE 19

| Example No. | | 92 | | | |
|---|---|---|---|---|---|
| Proportions (g) | Graft polymerization precursor | 95 | 75 | 25 | 5 |
| | Ethylene-propylene-deine | 5 | 25 | 75 | 95 |
| Characteristics (% by weight) | Grafting efficiency of styrene polymer | 61.4 | 59.6 | 56.2 | 66.3 |
| | Insoluble part in xylene | 16.7 | 14.1 | 7.8 | 1.5 |
| Appearance of compression-molded plate | Phase seperation | None | None | None | None |
| | Layer seperation | None | None | None | None |

TABLE 20

| | | Example No. | | | | | | | | | | | |
|---|---|---|---|---|---|---|---|---|---|---|---|---|---|
| | | 93 | | | 94 | | | 95 | | | 96 | | |
| Proportion of graft resin composition (Example) | | (84) | | | (85) | | | (86) | | | (87) | | |
| Kneading temperature (°C.) | | 140 | 220 | 260 | 140 | 220 | 260 | 140 | 220 | 260 | 140 | 220 | 260 |
| Characteristics (% by weight) | Grafting efficiency of styrene polymer | 30.1 | 65.1 | 48.2 | 32.4 | 61.2 | 44.7 | 35.5 | 64.1 | 45.7 | 38.5 | 63.4 | 42.9 |
| | Insoluble part in xylene | 4.1 | 19.2 | 23.5 | 3.3 | 15.4 | 21.5 | 4.8 | 17.1 | 23.6 | 3.3 | 14.2 | 19.3 |
| Appearance of compression molded plate | Phase seperation | None | None | None | None | None | None | None | None | None | None | None | None |
| | Layer seperation | None | None | None | None | None | None | None | None | None | None | None | None |

TABLE 21

| | | Example No. | | | | | | | |
|---|---|---|---|---|---|---|---|---|---|
| | | 97 | | 98 | | 99 | | 100 | |
| Proportion of graft resin composition (Example) | | (84) | | (85) | | (86) | | (87) | |
| kneader Note 7 | | 1 | 2 | 1 | 2 | 1 | 2 | 1 | 2 |
| Characteristics (% by weight) | Grafting efficiency of styrene polymer | 64.3 | 49.5 | 57.1 | 47.5 | 58.4 | 51.3 | 55.9 | 48.5 |
| | Insoluble part in xylene | 11.8 | 15.3 | 8.4 | 13.3 | 10.5 | 15.7 | 9.3 | 13.8 |
| Appearance of compression-molded plate | Phase separation | None | None | None | None | None | None | None | None |
| | Layer separation | None | None | None | None | None | None | None | None |

Note 7: Kind of kneader
1 Banbury type mixer
2 Single screw

TABLE 22

| Example No. | | 101 | 102 | 103 | 104 |
|---|---|---|---|---|---|
| Characteristics (% by weight) | Grafting efficiency of styrene (% by weight) Note 10 | 11.9 | 12.4 | 18.3 | 16.5 |
| | Insoluble part in xylene | 2.2 | 0.9 | 2.1 | 2.9 |
| Appearance of compres- | Phase separation | None | None | None | None |

TABLE 22-continued

| Example No. | | 101 | 102 | 103 | 104 |
|---|---|---|---|---|---|
| sion-molded plate | Layer separation | None | None | None | None |

Note 10: As for the graft polymerization precursor, since the styrene polymer is a matrix, it is thought to be preferable to obtain the grafting efficiency of ethylene copolymer. However, since there is no measuring means, the grafting efficiency with respect to the ethylene copolymer of styrene polymer was obtained.

TABLE 23

| Example No. | | | | 105 | | |
|---|---|---|---|---|---|---|
| Proportions (g) | Graft polymerization precursor (Example 84) | 95 | 75 | 25 | 5 |
| | Styrene polymer | 5 | 25 | 75 | 95 |
| Characteristics (% by weight) | Grafting efficiency of styrene polymer | 46.7 | 25.2 | 4.9 | 0.5 |
| | Insoluble part in xylene | 13.1 | 7.3 | 0.8 | 0.1 |
| Appearance of compression-molded plate | Phase separation | None | None | None | None |
| | Layer separation | None | None | None | None |

TABLE 24

| Example No. | | | | 106 | | |
|---|---|---|---|---|---|---|
| Proportions (g) | Grafting polymerization precursor (Example 85) | 95 | 75 | 25 | 5 |
| | Styrene polymer | 5 | 25 | 75 | 95 |
| Characteristics (% by weight) | Grafting efficiency of styrene polymer | 48.6 | 24.9 | 5.6 | 0.7 |
| | Insoluble part in xylene | 13.8 | 6.7 | 1.2 | 0.1 |
| Appearance of compression-molded plate | Phase separation | None | None | None | None |
| | Layer separation | None | None | None | None |

TABLE 25

| Example No. | | | | 107 | | |
|---|---|---|---|---|---|---|
| Proportions (g) | Grafting polymerization precursor (Example 86) | 95 | 75 | 25 | 5 |
| | Styrene polymer | 5 | 25 | 75 | 95 |
| Characteristics (% by weight) | Grafting efficiency of styrene polymer | 50.4 | 26.9 | 7.3 | 1.3 |
| | Insoluble part in xylene | 15.1 | 7.7 | 1.7 | 0.5 |
| Appearance of compression-molded plate | Phase separation | None | None | None | None |
| | Layer separation | None | None | None | None |

TABLE 26

| Example No. | | | | 108 | | |
|---|---|---|---|---|---|---|
| Proportions (g) | Graft polymerization precursor (Example 87) | 95 | 75 | 25 | 5 |
| | Styrene polymer | 5 | 25 | 75 | 95 |
| Characteristics (% by weight) | Grafting efficiency of styrene polymer | 47.9 | 23.5 | 5.9 | 1.1 |
| | Insoluble part in xylene | 14.6 | 6.3 | 1.2 | 0.2 |
| Appearance of compression-molded plate | Phase separation | None | None | None | None |
| | Layer separation | None | None | None | None |

TABLE 27

| Example No. | | | | 109 | | |
|---|---|---|---|---|---|---|
| Proportions (g) | Graft polymerization precursor Note 1 | 30 | 30 | 20 | 20 |
| | Styrene polymer | 40 | 30 | 50 | 30 |
| | Epoxy-group-containing copolymer | 30 | 40 | 30 | 50 |
| Characteristics (% by weight) | Grafting efficiency of styrene polymer (% by weight) | 14.6 | 19.1 | 8.2 | 13.5 |
| | Insoluble part in xylene | 5.3 | 6.5 | 4.8 | 5.1 |
| Appearance of compression-molded plate | Phase separation | None | None | None | None |
| | Layer separation | None | None | None | None |

Note 1: The ethylene copolymer used for the preparation of graft polymerization precursor was the same as the epoxy-group-containing ethylene copolymer used for the mixture and the same as in Note 1 in Table 8.

TABLE 28

| Example No. | | 110 | | | |
|---|---|---|---|---|---|
| Proportions (g) | Graft polymerization precursor Note 2 | 30 | 30 | 20 | 20 |
| | Styrene polymer | 40 | 30 | 50 | 30 |
| | Ethylene acrylic ethyl copolymer | 30 | 40 | 30 | 50 |
| Characteristics (% by weight) | Grafting efficiency of styrene polymer | 15.1 | 20.1 | 9.1 | 12.8 |
| | Insoluble part in xylene | 4.8 | 7.7 | 3.2 | 5.4 |
| Appearance of compression-molded plate | Phase separation | None | None | None | None |
| | Layer separation | None | None | None | None |

Note 2: The ethylene copolymer use for the preparation of the graft polymerization precurser is the same as the ethylene-ethyl acrylate copolymer used for the mixture and is the same as in Note 2 in Table 8.

TABLE 29

| Example No. | | 111 | | | |
|---|---|---|---|---|---|
| Proportions (g) | Graft polymerization precursor Note 3 | 30 | 30 | 20 | 20 |
| | Styrene polymer | 40 | 30 | 50 | 30 |
| | Ethylene-vinyl acetate copolymer | 30 | 40 | 30 | 50 |
| Characteristics (% by weight) | Grafting efficiency of styrene polymer | 17.5 | 23.4 | 12.4 | 16.9 |
| | Insoluble part in xylene | 5.3 | 9.1 | 4.4 | 7.6 |
| Appearance of compression-molded plate | Phase separation | None | None | None | None |
| | Layer separation | None | None | None | None |

Note 3 : The ethylene copolymer used for the preparation of the graft polymerization precursor is the same as the ethylene-vinyl acetate copolymer used for the mixture and is the same as in Note 3 in Table 8.

TABLE 30

| Example No. | | 112 | | | |
|---|---|---|---|---|---|
| Proportions (g) | Graft polymerization precursor Note 4 | 30 | 30 | 20 | 20 |
| | Styrene polymer | 40 | 30 | 50 | 30 |
| | Ethylene-propylene-diene copolymer rubber | 30 | 40 | 30 | 50 |
| Characteristics (% by weight) | Grafting efficiency of styrene polymer | 16.1 | 20.7 | 10.9 | 14.3 |
| | Insoluble part in xylene | 4.9 | 8.7 | 4.0 | 7.2 |
| Appearance of compression-molded plate | Phase separation | None | None | None | None |
| | Layer separation | None | None | None | None |

Note 4: The ethylene copolymer used for the preparation of the graft polymerization precursor is the same as the ethylene-propylene-diene copolymer used for the mixture and the same as in Note 4 in Table 8.

TABLE 31

| | | Example No. 113 | | | | |
|---|---|---|---|---|---|---|
| Proportions (g) | Graft polymerization precursor Note 1 | 50 | 50 | 50 | 30 | 30 |
| | Methyl methacrylate polymer | 50 | | 25 | | 35 |
| | Epoxy-group-containing ethylene copolymer | | 50 | 25 | 70 | 35 |
| Characteristics (% by weight) | Grafting efficiency of methyl methacrylate polymer | 11.9 | 61.5 | 22.0 | 63.2 | 11.8 |
| | Insoluble part in Xylene | 2.3 | 7.7 | 4.1 | 7.9 | 2.1 |
| Appearance of compression-molded plate | Phase separation | None | None | None | None | None |
| | Layer separation | None | None | None | None | None |

Note 1 is the same as in Table 27

TABLE 32

| | | Example No. 114 | | | | |
|---|---|---|---|---|---|---|
| Proportions (g) | Graft polymerization precursor Note 2 | 50 | 50 | 50 | 30 | 30 |
| | Methyl methacrylate polymer | 50 | | 25 | | 35 |
| | Ethylene ethylacrylate copolymer | | 50 | 25 | 70 | 35 |
| Characteristics (% by weight) | Grafting efficiency of methyl methacrylate polymer | 13.2 | 69.4 | 30.2 | 78.9 | 13.8 |
| | Insoluble part in Xylene | 2.6 | 9.0 | 3.2 | 8.4 | 1.7 |
| Appearance of compression-molded plate | Phase separation | None | None | None | None | None |
| | Layer separation | None | None | None | None | None |

Note 2 is the same as in Table 28.

TABLE 33

| | | Example No. 115 | | | | |
|---|---|---|---|---|---|---|
| Proportions (g) | Graft polymerization precursor Note 3 | 50 | 50 | 50 | 30 | 30 |
| | Methyl methacrylate polymer | 50 | | 25 | | 35 |

TABLE 33-continued

|  |  | Example No. 115 | | | | |
|---|---|---|---|---|---|---|
| Characteristics (% by weight) | Ethylene-vinyl acetate copolymer | | 50 | 25 | 70 | 35 |
| | Grafting efficiency of methyl methacrylate polymer | 14.8 | 73.1 | 33.3 | 80.0 | 15.2 |
| | Insoluble part in Xylene | 3.1 | 9.8 | 3.9 | 9.0 | 2.6 |
| Appearance of compression-molded plate | Phase separation | None | None | None | None | None |
| | Layer separation | None | None | None | None | None |

Note 3 is the same as in Table 29.

TABLE 34

|  |  | Example No. 116 | | | | |
|---|---|---|---|---|---|---|
| Proportions (g) | Graft polymerization precursor Note 3 | 50 | 50 | 50 | 30 | 30 |
| | Methyl methacrylate polymer | 50 | | 25 | | 35 |
| | Ethylene propylene-diene copolymer rubber | | 50 | 25 | 70 | 35 |
| Characteristics (% by weight) | Grafting efficiency of methyl methacrylate polymer | 13.4 | 54.8 | 29.3 | 51.0 | 14.3 |
| | Insoluble part in Xylene | 3.4 | 10.2 | 3.5 | 8.3 | 2.4 |
| Appearance of compression-molded plate | Phase separation | None | None | None | None | None |
| | Layer separation | None | None | None | None | None |

Note 4 is the same as in Table 30.

TABLE 35

|  |  | Example No. 117 | | | | |
|---|---|---|---|---|---|---|
| Proportions (g) | Graft polymerization precursor Note 1 | 50 | 50 | 50 | 30 | 30 |
| | Acrylonitrile-styrene copolymer | 50 | | 25 | | 35 |
| | Epoxy-group-containing ethylene copolymer | | 50 | 25 | 70 | 35 |
| Characteristics (% by weight) | Grafting efficiency of acrylonitrile-styrene copolymer | 21.0 | 62.1 | 21.4 | 60.1 | 11.8 |
| | Insoluble part in xylene | 12.1 | 20.5 | 11.5 | 18.3 | 8.9 |
| Appearance of compression-molded plate | Phase separation | None | None | None | None | None |
| | Layer separation | None | None | None | None | None |

Note 1 is the same as in Table 27.

TABLE 36

|  |  | Example No. 118 | | | | |
|---|---|---|---|---|---|---|
| Proportions (g) | Graft polymerization precursor Note 2 | 50 | 50 | 50 | 30 | 30 |
| | Acrylonitrile-styrene copolymer | 50 | | 25 | | 35 |
| | Ethylene ethylacrylate copolymer | | 50 | 25 | 70 | 35 |
| Characteristics (% by weight) | Grafting efficiency of acrylonitrile-styrene copolymer | 19.8 | 70.5 | 15.7 | 73.1 | 14.6 |
| | Insoluble part in Xylene | 13.2 | 19.5 | 9.5 | 11.3 | 7.4 |
| Appearance of compression-molded plate | Phase separation | None | None | None | None | None |
| | Layer separation | None | None | None | None | None |

Note 2 is the same as in Table 28.

TABLE 37

|  |  | Example No. 119 | | | | |
|---|---|---|---|---|---|---|
| Proportions (g) | Graft polymerization precursor Note 3 | 50 | 50 | 50 | 30 | 30 |
| | Acrylonitrile-styrene copolymer | 50 | | 25 | | 35 |
| | Ethylene-vinyl acetate copolymer | | 50 | 25 | 70 | 35 |
| Characteristics (% by weight) | Grafting efficiency of acrylonitrile-styrene copolymer | 21.8 | 74.1 | 17.7 | 76.5 | 16.9 |
| | Insoluble part in Xylene | 14.6 | 20.3 | 10.8 | 13.9 | 8.3 |
| Appearance of compression-molded plate | Phase separation | None | None | None | None | None |
| | Layer separation | None | None | None | None | None |

Note 3 is the same as in Table 29.

TABLE 38

|  |  | Example No. 120 | | | | |
|---|---|---|---|---|---|---|
| Proportions (g) | Graft polymerization precursor Note 4 | 50 | 50 | 50 | 30 | 30 |
| | Acrylonitrile-styrene copolymer | 50 | | 25 | | 35 |
| | Ethylene-propylene-diene copolymer rubber | | 50 | 25 | 70 | 35 |

TABLE 38-continued

|  |  | Example No. 120 |  |  |  |  |
|---|---|---|---|---|---|---|
| Characteristics (% by weight) | Grafting efficiency of acrylonitrile-styrene copolymer | 19.3 | 49.9 | 16.3 | 45.2 | 13.7 |
|  | Insoluble part in Xylene | 12.3 | 17.9 | 9.4 | 11.8 | 8.6 |
| Appearance of compression-molded plate | Phase separation | None | None | None | None | None |
|  | Layer separation | None | None | None | None | None |

Note 4 is the same as in Table 30.

TABLE 39

|  |  | Example No. |  |  |  |
|---|---|---|---|---|---|
|  |  | 121 | 122 | 123 | 124 |
| Mixture | Graft polymerization precursor | Note 1 | Note 2 | Note 3 | Note 4 |
|  | Ethylene copolymer | Note 1 | Note 2 | Note 3 | Note 4 |
| Characteristics (% by weight) | Grafting efficiency of methyl methacrylate-n-butyl-acrylate copolymer | 60.5 | 51.0 | 52.7 | 49.5 |
|  | Insoluble part in Xylene | 15.4 | 11.1 | 14.1 | 12.3 |
| Appearance of compression-molded plate | Phase separation | None | None | None | None |
|  | Layer separation | None | None | None | None |

Notes 1 to 4 are the same as in Table 8.

TABLE 40

|  |  | Example No. |  |  |  |
|---|---|---|---|---|---|
|  |  | 125 | 126 | 127 | 128 |
| Characteristics (% by weight) | Grafting efficiency of vinyl acetate polymer | 63.3 | 54.5 | 57.5 | 55.6 |
|  | Insoluble part in xylene | 25.1 | 13.6 | 16.3 | 15.1 |
| Appearance of compression-molded plate | Phase separation | None | None | None | None |
|  | Layer separation | None | None | None | None |

What is claimed is:

1. A method of manufacturing a grafted resin composition by grafting a graft polymerization precursor or a mixture consisting of 1 to 99% by weight of said graft polymerization precursor and 99 to 1 % by weight of a polymer, by melting said graft polymerization precursor or mixture at a temperature of 100° to 300° C. and kneading it, said graft polymerization precursor being a resin composition prepared by suspending in water (a) 100 parts by weight of an etylene polymer, adding to the resultant suspension a solution obtained by dissolving in (b) 5 to 400 parts by weight of one or more vinyl monomers selected from a group consisting of aromatic vinyl monomers, methacrylic ester monomers, acrylic ester monomers, methacrylonitrile, acrylonitrile and vinyl ester monomers, (c) from 0.1 to 10 parts by weight, per 100 parts by weight of said vinyl monomer or monomers, of one or more radical polymerizable organic peroxides represented by the formula

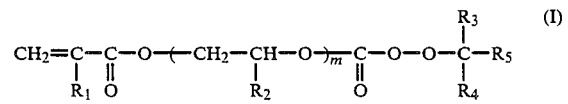

$$CH_2=C-C-O-(CH_2-CH-O)_{\overline{m}}C-O-O-C-R_5 \quad (I)$$
with substituents $R_1, O, R_2, O, R_4$ where $R_1$ is a hydrogen atom or an alkyl group with a carbon number of 1 to 2, $R_2$ is a hydrogen atom or a methyl group, $R_3$ and $R_4$ are alkyl groups with carbon numbers of 1 to 4 and $R_5$ is an alkyl group, a phenyl group or a alkyl-substituted phenyl group with a carbon number of 1 to 12 or a cycloalkyl group with a carbon number of 3 to 12, and m is 1 or 2, or a formula

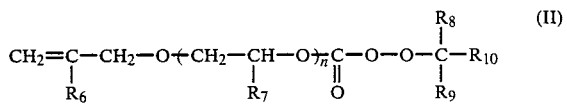

$$CH_2=C-CH_2-O(CH_2-CH-O)_{\overline{n}}C-O-O-C-R_{10} \quad (II)$$
with substituents $R_6, R_7, O, R_9$ and $R_8$ where $R_6$ is a hydrogen atom or an alkyl group with a carbon number of 1 to 4, $R_7$ is a hydrogen atom or a methyl group, $R_8$ and $R_9$ are alkyl groups with carbon numbers of 1 to 4, $R_{10}$ is an alkyl group, a phenyl group or an alkyl-substituted phenyl group with a carbon number of 1 to 12 or a cycloalkyl group with a carbon number of 3 to 12, and n is 0, 1 or 2, and (d) 0.01 to 5 parts by weight, per 100 parts by weight of the sum of said vinyl monomers and radical polymerezable organic peroxides, of a radical polymerization initiator having a decomposition temperature of 40° to 90° C. for obtaining a half reduction period of 10 hours, heating the resultant mixture under a condition that said radical polymerization initiator is not substantially decomposed whereby to cause impregnation of said ethylene polymer with said vinyl monomer or monomers, said radical polymerizable organic peroxides and said radical polymerization initiator, and, when the content of free vinyl monomer or monomers, radical polymerizable organic peroxide or peroxides and radical polymerizable initiator becomes less than 50% weight of the initial amount, elevating the temperature of said water suspension to cause copolymerization of said vinyl monomer or monomers and said radical polymerizable organic peroxide or peroxides in said ethylene (co-and/or) polymer, said polymer forming the mixture with said graft polymerization precursor being either one or both members of a group consisting of (i) ethylene polymer and (ii) a vinyl polymer obtained through polymerization of one or more members selected from the group consisting of aromatic vinyl monomers, methacrylic ester monomers, acrylic ester monomers, methacrylonitrile, acrylonitrile and vinyl ester monomers.

2. The method of manufacturing a grafted resin composition according to claim 1, wherein said ethylene polymer is a low density ethylene polymer with a density of 0.910 to 0.935 g/cm.

3. The method of manufacturing a grafted resin composition according to claim 1, wherein said ethylene polymer is an epoxy-group-containing ethylene copolymer obtained through copolymerization of 60 to 99.5% by weight of ethylene and 0.5 to 40 by weight of glycidyl methacrylate glycidyl acrylate and said epoxy-group containing ethylene copolymer has a particle size of 0.1 t 5 mm.

4. The method of manufacturing a grafted resin composition according to claim 1, wherein said ethylene polymer is composed of 50 to less than 99% by weight of ethylene and 50 to more than 1% by weight of methacrylate ester acrylate ester and said ethylene polymer has a particle size of 0.1 to 5 mm.

5. The method of manufacturing a grafted resin composition according to claim 1, wherein said vinyl ester is a vinyl acetate.

6. The method of manufacturing a grafted resin composition according to claim 1, wherein said ethylene polymer is composed of 50 to less than 99% by weight of ethylene and 50 to more than 1% by weight of vinyl ester and said ethylene copolymer has a particle size of 0.1 to 5 mm.

7. The method of manufacturing a grafted resin composition according to claim 1, wherein said ethylene polymer is an ethylene-propylene copolymer rubber composed of 40 to 80% by weight of ethylene and 60 to 20% by weight of propylene, and said ethylene-propylene copolymer rubber has a particle size of 2 to 8 mm.

8. The method of manufacturing a grafted resin composition according to claim 1, wherein said ethylene polymer is an ethylene-propylene-diene copolymer rubber composed of 40 to 80% by weight of ethylene and 60 to 20% by weight of propylene and diene, and said ethylene-propylene-diene copolymer rubber has a particle size of 2 to 8 mm.

9. The method of manufacturing a grafted resin composition according to claim 1, wherein said ethylene polymer kneaded with said graft polymerization precursor is the same in the monomer composition as the ethylene polymer in said graft polymerization precursor.

10. The method of manufacturing a graft resin composition according to claim 2, wherein said low-density ethylene polymer kneaded with said graft polymerization precursor is the same in density as the low-density ethylene polymer in said graft polymerization precursor.

11. The method of manufacturing a graft resin composition according to claim 1, where in at least 50% by weight of the vinyl monomer or monomers used for the preparation of said graft polymerization precursor consists of aromatic vinyl monomer or monomers.

12. The method of manufacturing a grafted resin composition according to claim 1, wherein at least 50% by weight of the vinyl monomer or monomers used for the preparation of said graft polymerization precursor consists of methacrylate acrylate ester monomer or monomers.

13. The method of manufacturing a grafted resin composition according to claim 1, wherein said vinyl monomer or monomers kneaded with said graft polymerization precursor is or are the same in monomer composition as the vinyl monomer or monomers in said graft polymerization precursor.

* * * * *

UNITED STATES PATENT AND TRADEMARK OFFICE
CERTIFICATE OF CORRECTION

PATENT NO. : 4 839 432
DATED : June 13, 1989
INVENTOR(S) : Yasuo MORIYA et al

It is certified that error appears in the above-identified patent and that said Letters Patent is hereby corrected as shown below:

Column 39, line 46; change "etylene" to ---ethylene---.

Column 40, line 52; change "polymerezable" to
    ---polymerizable---.
        line 65; after "50%" insert ---by---.

Column 41, line 28 ; after "ester" (first occurrence) insert ---or--.

Column 42, line 33; after "methacrylate" insert
    ---and/or---.

Signed and Sealed this

Seventeenth Day of April, 1990

Attest:

HARRY F. MANBECK, JR.

Attesting Officer

Commissioner of Patents and Trademarks